United States Patent
Kaminski et al.

(10) Patent No.: US 10,129,168 B2
(45) Date of Patent: Nov. 13, 2018

(54) METHODS AND SYSTEMS PROVIDING A SCALABLE PROCESS FOR ANOMALY IDENTIFICATION AND INFORMATION TECHNOLOGY INFRASTRUCTURE RESOURCE OPTIMIZATION

(71) Applicant: Analitiqa Corp., Bolton, MA (US)

(72) Inventors: Ronald R. Kaminski, Southaven, MS (US); Sterling Wight, Baraboo, WI (US)

(73) Assignee: ANALITIQA CORPORATION, Bolton, MA (US)

( * ) Notice: Subject to any disclaimer, the term of this patent is extended or adjusted under 35 U.S.C. 154(b) by 384 days.

(21) Appl. No.: 14/730,377

(22) Filed: Jun. 4, 2015

(65) Prior Publication Data
US 2015/0365309 A1    Dec. 17, 2015

Related U.S. Application Data

(60) Provisional application No. 62/013,017, filed on Jun. 17, 2014.

(51) Int. Cl.
*G06F 15/173* (2006.01)
*H04L 12/911* (2013.01)
(Continued)

(52) U.S. Cl.
CPC .......... *H04L 47/70* (2013.01); *H04L 41/0896* (2013.01); *H04L 43/0817* (2013.01)

(58) Field of Classification Search
CPC ..... H04L 41/00; H04L 41/06; H04L 41/0631; H04L 41/0654; H04L 41/0672–41/0681;
(Continued)

(56) References Cited

U.S. PATENT DOCUMENTS

| 6,108,782 A * | 8/2000 | Fletcher | G06F 8/65 370/245 |
| 6,374,367 B1 * | 4/2002 | Dean | G06F 8/445 712/227 |

(Continued)

OTHER PUBLICATIONS

Leo Noteboom—What is the System Idle Process and why is it using most of the CPU—Ask Leo—Mar. 17, 2008.*
(Continued)

*Primary Examiner* — Tauqir Hussain
(74) *Attorney, Agent, or Firm* — Blueshift IP, LLC; Cynthia M. Gilbert

(57) ABSTRACT

A method for anomaly identification and IT resource optimization includes retrieving, by a workload engine executing on a first computing resource, from a database populated by a client agent executing on a second computing resource, a metric associated with a process. The method includes analyzing, by the workload engine, the retrieved metric and the process. The method includes associating, by the workload engine, at least one workload with the process, responsive to the analysis. The method includes analyzing, by an exception engine executing on the first computing resource, the retrieved metric, the process, and the at least one workload; analyzing includes applying at least one workload rule to the at least one workload. The method includes identifying, by the exception engine, an operational anomaly within the process, responsive to the analysis by the exception engine. The method includes providing a recommendation for mitigating the operational anomaly.

13 Claims, 6 Drawing Sheets

(51) Int. Cl.
*H04L 12/26* (2006.01)
*H04L 12/24* (2006.01)

(58) Field of Classification Search
CPC ............ H04L 41/0803; H04L 41/0823; H04L 41/0836; H04L 41/50; H04L 43/00; H04L 43/04; H04L 43/06; H04L 43/08–43/0894; H04L 43/50; G06F 11/00; G06F 11/004–11/0715; G06F 11/0721–11/0796; G06F 11/30; G06F 11/3006; G06F 11/3055–11/3058; G06F 11/32; G06F 11/321; G06F 11/327–11/34; G06F 11/3409; G06F 11/3428–11/3457
See application file for complete search history.

(56) References Cited

U.S. PATENT DOCUMENTS

| | | | | |
|---|---|---|---|---|
| 6,484,276 | B1* | 11/2002 | Singh | G06F 11/263 |
| | | | | 714/38.13 |
| 6,691,067 | B1 | 2/2004 | Ding et al. | |
| 7,395,187 | B2 | 7/2008 | Duyanovich et al. | |
| 7,818,745 | B2 | 10/2010 | Snyder | |
| 8,336,052 | B2* | 12/2012 | Sharoff | G06F 11/3414 |
| | | | | 718/102 |
| 8,417,812 | B1 | 4/2013 | Gulati et al. | |
| 8,949,658 | B1 | 2/2015 | Scanlan et al. | |
| 9,166,895 | B1* | 10/2015 | Sivaraman | G06F 9/5077 |
| 9,391,866 | B1* | 7/2016 | Martin | H04L 41/0681 |
| 9,515,905 | B1* | 12/2016 | Blanding | H04L 43/04 |
| 9,626,226 | B2* | 4/2017 | Shazly | G06F 9/5083 |
| 9,658,779 | B2* | 5/2017 | Kawakami | G06F 3/061 |
| 2003/0009507 | A1* | 1/2003 | Shum | G06F 11/3409 |
| | | | | 718/104 |
| 2003/0055969 | A1* | 3/2003 | Begun | G06F 1/3203 |
| | | | | 709/226 |
| 2004/0025162 | A1* | 2/2004 | Fisk | G06F 3/0613 |
| | | | | 718/105 |
| 2004/0220947 | A1* | 11/2004 | Aman | G06F 11/3433 |
| 2005/0086263 | A1* | 4/2005 | Ngai | G06F 17/30306 |
| 2005/0108713 | A1* | 5/2005 | Geye | G06F 9/5033 |
| | | | | 718/100 |
| 2007/0016670 | A1* | 1/2007 | Cooper | H04L 43/12 |
| | | | | 709/224 |
| 2008/0109811 | A1* | 5/2008 | Krauthgamer | G06F 1/3203 |
| | | | | 718/104 |
| 2009/0313625 | A1* | 12/2009 | Sharoff | G06F 11/3414 |
| | | | | 718/100 |
| 2011/0125895 | A1 | 5/2011 | Anderson et al. | |
| 2011/0209146 | A1* | 8/2011 | Box | G06F 9/5077 |
| | | | | 718/1 |
| 2011/0209156 | A1* | 8/2011 | Box | G06F 9/5077 |
| | | | | 718/104 |
| 2011/0321058 | A1* | 12/2011 | Schmidt | G06F 9/5083 |
| | | | | 718/105 |
| 2014/0032837 | A1* | 1/2014 | Nagasaki | G06F 3/0605 |
| | | | | 711/114 |
| 2014/0068627 | A1* | 3/2014 | Goh | G06F 1/206 |
| | | | | 718/105 |
| 2014/0289418 | A1 | 9/2014 | Cohen et al. | |
| 2015/0089053 | A1 | 3/2015 | Harper et al. | |
| 2015/0149636 | A1* | 5/2015 | Shazly | G06F 9/505 |
| | | | | 709/226 |
| 2015/0378604 | A1* | 12/2015 | Kawakami | G06F 3/06 |
| | | | | 710/5 |

OTHER PUBLICATIONS

Kaminski, Ron, "Automating Process and Workload Pathology Detection," 11 pages, 2003, Proceedings of the Computer Measurement Group 2003 International Conference.

Kaminski, Ronald R., "Time Stable Workload Characterization Techniques," 11 pages, 2003, Proceedings of the Computer Measurement Group 2003 International Conference.

Kaminski, Ronald R., Ding, Yiping, "Business Metrics and Capacity Planning," 9 pages, 2003, Proceedings of the Computer Measurement Group 2003 International Conference.

Kaminski, Ronald R., "Automating Workload Characterization by Policy," 12 pages, 2004, Proceedings of the Computer Measurement Group 2004 International Conference.

Kaminski, Ron, "Automating Process and Workload Pathology Detection," 61 pages, 2004.

Trubin, Igor, PhD, "Capturing Workload Pathology by Statistical Exception Detection System," 7 pages, 2005, Proceedings of the Computer Measurement Group 2005 International Conference.

Kaminski, Ronald, "Automating Process Pathology Detection Rule Engine Design Hints," 11 pages, 2008, Proceedings of the Computer Measurement Group 2008 International Conference.

Bowker, Mark, "Automating the Data Center with VMware Lifecycle Manager," 3 pages, Apr. 2008, The Enterprise Strategy Group, Inc.

Schreck, Galen, with Balaouras, Stephanie and Crumb, Alex, "Why Isn't Server Virtualization Saving Us More? A Few Small Changes May Dramatically Increase Your Efficiency," 5 pages, Jan. 28, 2009, Forrester Research, Inc.

Kaminski, Ron, "Automating Avoiding Application Outages or Poor Performance Due to "Disk Full" or Badly Timed Background Maintenance," 11 pages, 2011, Proceedings of the Computer Measurement Group 2011 International Conference.

Trubin, Igor, PhD, "SEDS-Lite: Using Open Source Tools (R, Birt and MySQL) to Report and Analyze Performance Data," 26 pages, 2011, Proceedings of the Computer Measurement Group 2011 International Conference.

Kaminski, Ron, "Modern Capacity and Performance Improvement Techniques in a Virtualized Infrastructure and Beyond," 88 pages, 2012.

* cited by examiner

METHODS AND SYSTEMS PROVIDING A SCALABLE PROCESS FOR ANOMALY IDENTIFICATION AND INFORMATION TECHNOLOGY INFRASTRUCTURE RESOURCE OPTIMIZATION

CROSS-REFERENCE TO RELATED APPLICATIONS

This application claims priority from U.S. Provisional Patent Application No. 62/013,017, filed on Jun. 17, 2014, entitled "Methods and Systems Providing a Scalable Process for Anomaly Identification and Information Technology Infrastructure Resource Optimization," which is hereby incorporated by reference.

BACKGROUND

The disclosure relates to detecting and addressing operations, system and application performance anomalies in computing resources. More particularly, the methods and systems described herein relate to functionality for anomaly identification and information technology infrastructure resource optimization.

Managing conventional data centers and applications in information technology (IT) operations is increasingly challenging. Complexity in conventional IT operations is escalating, typical IT staffs are overwhelmed, and IT budgets struggle to keep pace with increasing demand Typically, managers of IT resources have limited evaluation methods to track the by-minute performance and resource consumption of their information technology infrastructure assets, including real and virtual servers, memory devices, input/output (I/O) systems, network systems, operating systems, and application software for machine (including server) level operational efficiency, capacity, and utility. The results of current monitoring and evaluation methods typically fail to include identifying coding errors, rogue software, application and system inefficiencies, and other anomalies. Such anomalies and inefficiencies can consume much of the capacity and/or utility of IT assets, wasting their use, resulting in over-resourcing/over-purchasing of assets to meet needs that appear to require new resources because utilization is being wasted on activity that is not real work, and leading to delays in system access and loss of user-level productivity due to time delays in accessing system information. In addition, these same machine inefficiencies may lead to delays in IT project execution and to system failures, including outages that threaten business operations dependent on IT assets.

BRIEF SUMMARY

In one aspect, a method for anomaly identification and IT resource optimization includes retrieving, by a workload engine executing on a first computing resource, from a database populated by a client agent executing on a second computing resource, a metric associated with a process. The method includes analyzing, by the workload engine, the retrieved metric and the process. The method includes associating, by the workload engine, at least one workload with the process, responsive to the analysis. The method includes analyzing, by an exception engine executing on the first computing resource, the retrieved metric, the process, and the at least one workload; analyzing includes applying at least one workload rule to the at least one workload. The method includes identifying, by the exception engine, an operational anomaly within the process, responsive to the analysis by the exception engine. The method includes providing a recommendation for mitigating the operational anomaly. In another aspect, a non-transitory computer-readable medium tangibly stores instructions executable by at least one computer processor to perform the above method for anomaly identification and IT resource optimization.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

In some embodiments, the methods and systems described herein provide functionality for anomaly identification and resource optimization. Before describing these methods and systems in detail, however, a description is provided of a network in which such methods and systems may be implemented.

Figure 1A:
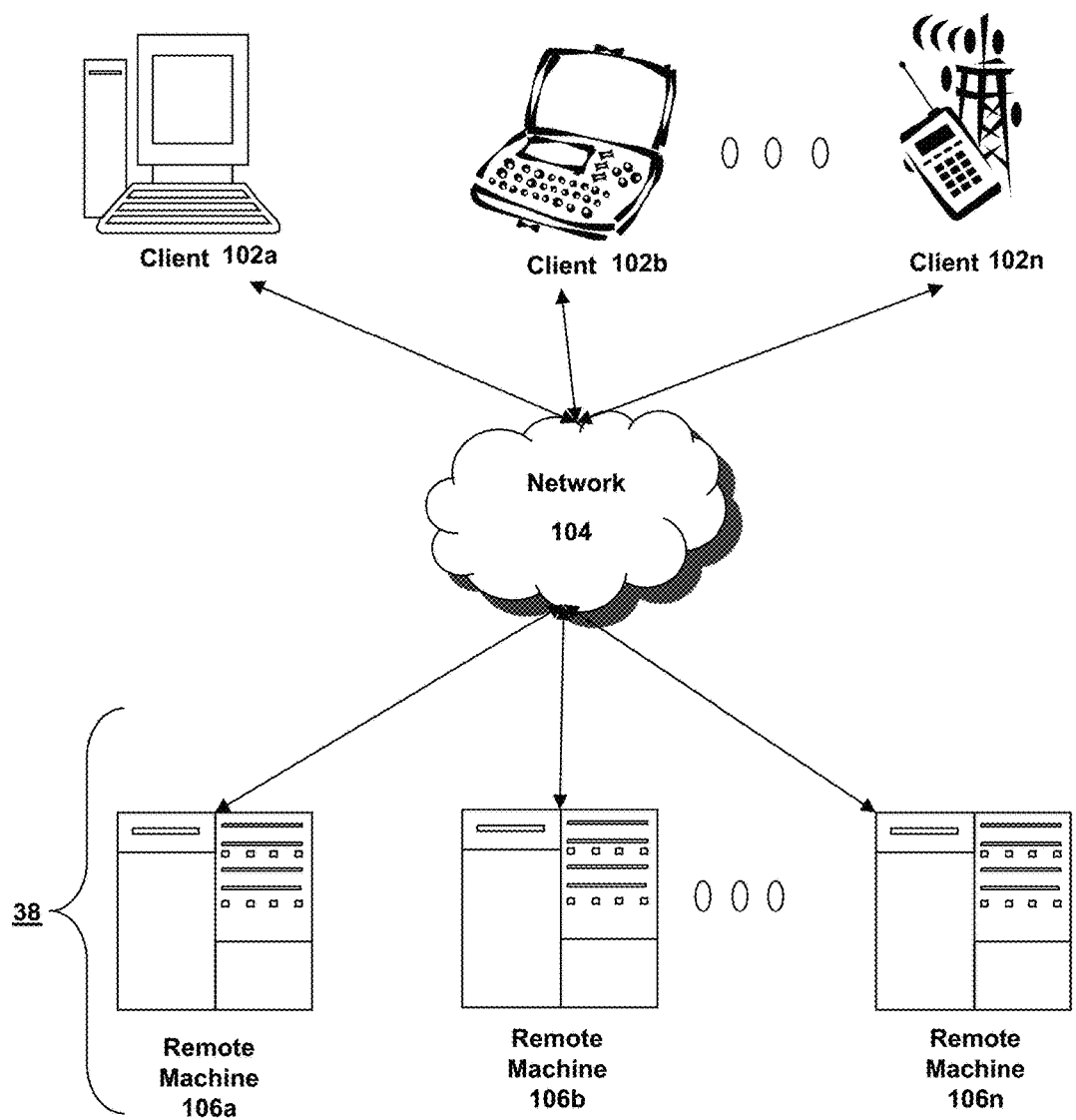
FIGS. 1A-1C are block diagrams depicting embodiments of computers useful in connection with the methods and systems described herein.

Referring now to FIG. 1A, an embodiment of a network environment is depicted. In brief overview, the network environment comprises one or more clients 102a-102n (also generally referred to as local machine(s) 102, client(s) 102, client node(s) 102, client machine(s) 102, client computer(s) 102, client device(s) 102, computing device(s) 102, endpoint(s) 102, or endpoint node(s) 102) in communication with one or more remote machines 106a-106n (also generally referred to as server(s) 106 or computing device(s) 106) via one or more networks 104.

Although FIG. 1A shows a network 104 between the clients 102 and the remote machines 106, the clients 102 and the remote machines 106 may be on the same network 104. The network 104 can be a local area network (LAN), such as a company Intranet, a metropolitan area network (MAN), or a wide area network (WAN), such as the Internet or the World Wide Web. In some embodiments, there are multiple networks 104 between the clients 102 and the remote machines 106. In one of these embodiments, a network 104' (not shown) may be a private network and a network 104 may be a public network. In another of these embodiments, a network 104 may be a private network and a network 104' a public network. In still another embodiment, networks 104 and 104' may both be private networks.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, an SDH (Synchronous Digital Hierarchy) network, a wireless network, and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol or protocols used to communicate among mobile devices (including tables and handheld devices generally), including AMPS, TDMA, CDMA, GSM, GPRS, UMTS, or LTE. In some embodiments, different types of data may be transmitted via different protocols. In other embodiments, the same types of data may be transmitted via different protocols.

A client 102 and a remote machine 106 (referred to generally as computing devices 100) can be any workstation, desktop computer, laptop or notebook computer, server, portable computer, mobile telephone, mobile smartphone, or other portable telecommunication device, media playing device, a gaming system, mobile computing device, or any other type and/or form of computing, telecommunications or media device that is capable of communicating on any type and form of network and that has sufficient processor power and memory capacity to perform the operations described herein. A client 102 may execute, operate or otherwise provide an application, which can be any type and/or form of software, program, or executable instructions, including, without limitation, any type and/or form of web browser, web-based client, client-server application, an ActiveX control, or a JAVA applet, or any other type and/or form of executable instructions capable of executing on client 102.

In one embodiment, a computing device 106 provides functionality of a web server. In some embodiments, a web server 106 comprises an open-source web server, such as the APACHE servers maintained by the Apache Software Foundation of Delaware. In other embodiments, the web server executes proprietary software, such as the INTERNET INFORMATION SERVICES products provided by Microsoft Corporation of Redmond, Wash., the ORACLE IPLANET web server products provided by Oracle Corporation of Redwood Shores, Calif., or the BEA WEBLOGIC products provided by BEA Systems of Santa Clara, Calif.

In some embodiments, the system may include multiple, logically-grouped remote machines 106. In one of these embodiments, the logical group of remote machines may be referred to as a server farm 38. In another of these embodiments, the server farm 38 may be administered as a single entity.

Figure 1B:
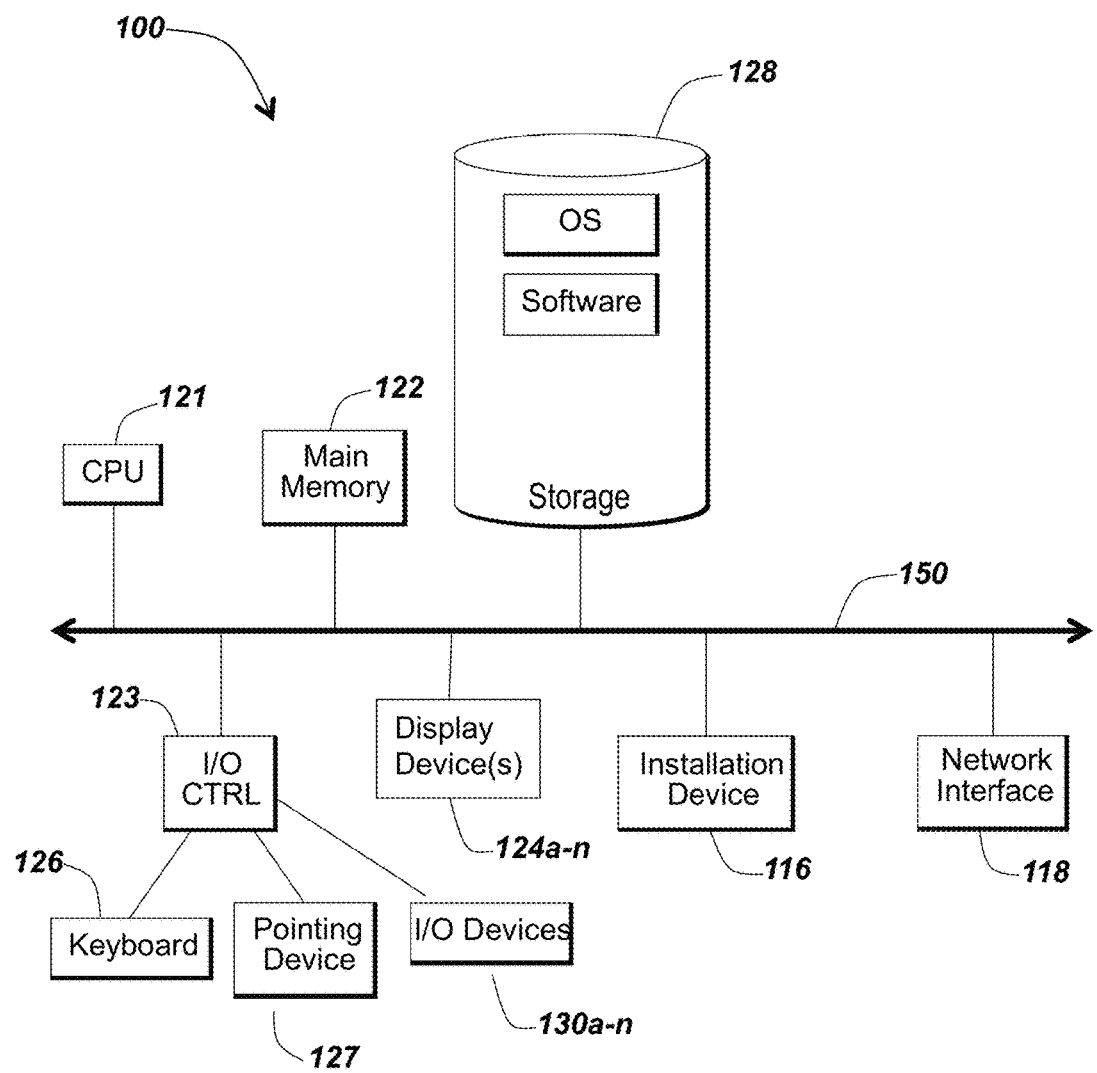
Figure 1C:
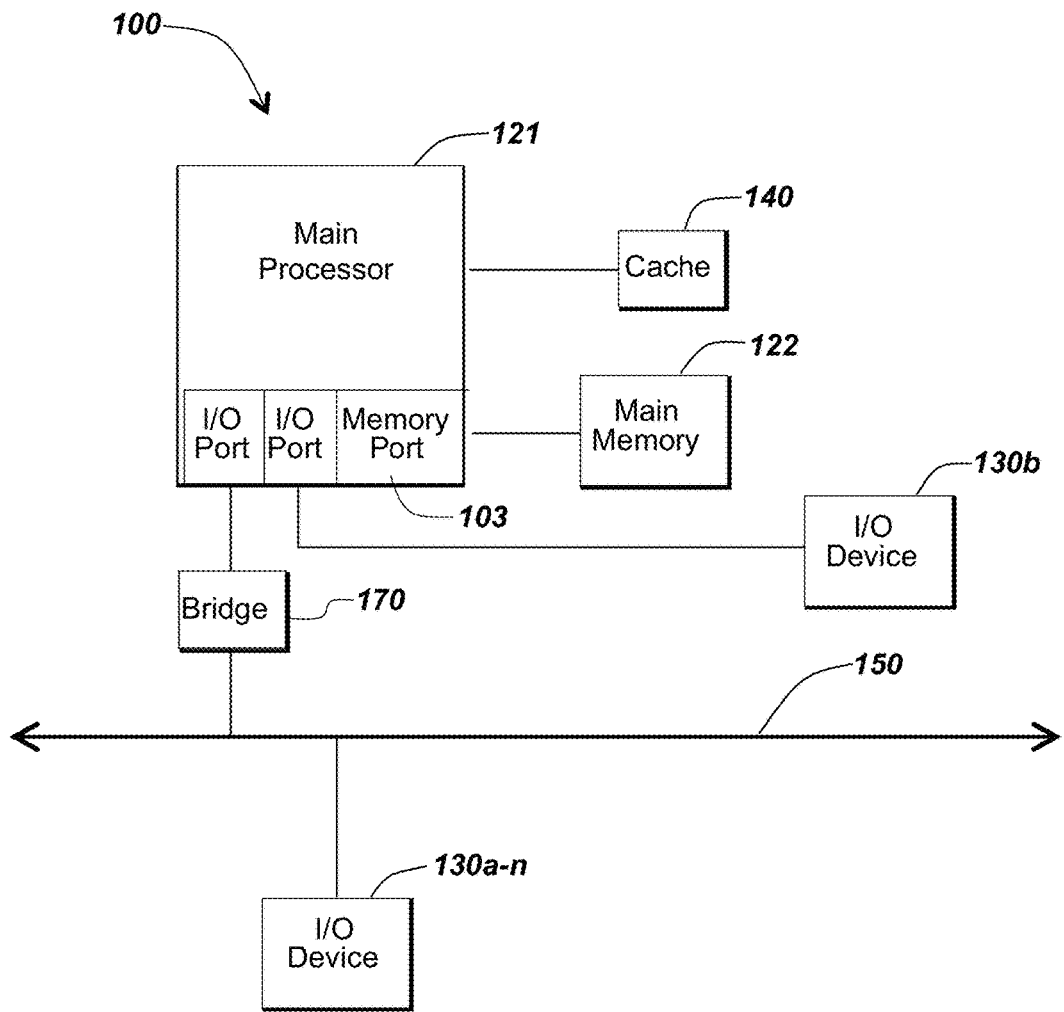

FIGS. 1B and 1C depict block diagrams of a computing device 100 useful for practicing an embodiment of the client 102 or a remote machine 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-n, a keyboard 126, a pointing device 127, such as a mouse, and one or more other I/O devices 130a-n. The storage device 128 may include, without limitation, an operating system and software. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; those manufactured by International Business Machines of White Plains, N.Y.; or those manufactured by Advanced Micro Devices of Sunnyvale, Calif. Other examples include SPARC processors, ARM processors, processors used to build UNIX/LINUX "white" boxes, and processors for mobile devices. The computing device 100 may be based on any of these processors, or any other processor capable of operating as described herein.

Main memory unit 122 may be one or more memory chips capable of storing data and allowing any storage location to be directly accessed by the microprocessor 121. The main memory 122 may be based on any available memory chips capable of operating as described herein. In the embodiment shown in FIG. 1B, the processor 121 communicates with main memory 122 via a system bus 150. FIG. 1C depicts an embodiment of a computing device 100 in which the processor communicates directly with main memory 122 via a memory port 103. FIG. 1C also depicts an embodiment in which the main processor 121 communicates directly with cache memory 140 via a secondary bus, sometimes referred to as a backside bus. In other embodiments, the main processor 121 communicates with cache memory 140 using the system bus 150.

In the embodiment shown in FIG. 1B, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 also communicates directly with an I/O device 130b via, for example, HYPERTRANSPORT, RAPIDIO, or INFINIBAND communications technology.

A wide variety of I/O devices 130a-130n may be present in the computing device 100. Input devices include keyboards, mice, trackpads, trackballs, microphones, scanners, cameras, and drawing tablets. Output devices include video displays, speakers, inkjet printers, laser printers, and dye-sublimation printers. The I/O devices may be controlled by an I/O controller 123 as shown in FIG. 1B. Furthermore, an I/O device may also provide storage and/or an installation medium 116 for the computing device 100. In some embodiments, the computing device 100 may provide USB connections (not shown) to receive handheld USB storage devices such as the USB Flash Drive line of devices manufactured by Twintech Industry, Inc. of Los Alamitos, Calif.

Referring still to FIG. 1B, the computing device 100 may support any suitable installation device 116, such as a floppy disk drive for receiving floppy disks such as 3.5-inch, 5.25-inch disks or ZIP disks; a CD-ROM drive; a CD-R/RW drive; a DVD-ROM drive; tape drives of various formats; a USB device; a hard-drive or any other device suitable for installing software and programs. In some embodiments, the computing device 100 may provide functionality for installing software over a network 104. The computing device 100 may further comprise a storage device, such as one or more hard disk drives or redundant arrays of independent disks, for storing an operating system and other software. Alternatively, the computing device 100 may rely on memory chips for storage instead of hard disks.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, 802.15.4, Bluetooth, ZIGBEE, CDMA, GSM, WiMax, and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 may comprise a built-in network adapter, network interface card, PCMCIA network card, card bus network adapter, wireless network adapter, USB network adapter, modem, or any other device suitable for interfacing the computing device 100 to any type of network capable of communication and performing the operations described herein.

In some embodiments, the computing device 100 may comprise or be connected to multiple display devices 124a-124n, each of which may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the UNIX and LINUX operating systems, any version of the MAC OS for Macintosh computers, any embedded operating system, any real-time operating system, any open source operating system, any proprietary operating system, any operating systems for mobile computing devices, or any other operating system capable of miming on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS CE, WINDOWS XP, WINDOWS 7, WINDOWS 8, and WINDOWS VISTA, all of which are manufactured by Microsoft Corporation of Redmond, Wash.; MAC OS manufactured by Apple Inc. of Cupertino, Calif.; OS/2 manufactured by International Business Machines of Armonk, N.Y.; Red Hat Enterprise Linux, a Linus-variant operating system distributed by Red Hat, Inc, of Raleigh, N.C.; Ubuntu, a freely-available operating system distributed by Canonical Ltd. of London, England; or any type and/or form of a Unix operating system, among others.

The computing device 100 can be any workstation, desktop computer, laptop or notebook computer, server, portable computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. In some embodiments, the computing device 100 may have different processors, operating systems, and input devices consistent with the device. In other embodiments the computing device 100 is a mobile device, such as a JAVA-enabled cellular telephone/smartphone or personal digital assistant (PDA). The computing device 100 may be a mobile device such as those manufactured, by way of example and without limitation, by Apple Inc. of Cupertino, Calif.; Google/Motorola Div. of Ft. Worth, Tex.; Kyocera of Kyoto, Japan; Samsung Electronics Co., Ltd. of Seoul, Korea; Nokia of Finland; Hewlett-Packard Development Company, L.P. and/or Palm, Inc. of Sunnyvale, Calif.; Sony Ericsson Mobile Communications AB of Lund, Sweden; or Research In Motion Limited of Waterloo, Ontario, Canada. In yet other embodiments, the computing device 100 is a smartphone, POCKET PC, POCKET PC PHONE, or other portable mobile device supporting Microsoft Windows Mobile Software.

In some embodiments, the computing device 100 is a digital audio player. In one of these embodiments, the computing device 100 is a digital audio player such as the Apple IPOD, IPOD TOUCH, IPOD NANO, and IPOD SHUFFLE lines of devices manufactured by Apple Inc. In another of these embodiments, the digital audio player may function as both a portable media player and as a mass storage device. In other embodiments, the computing device 100 is a digital audio player such as those manufactured by, for example, and without limitation, Samsung Electronics America of Ridgefield Park, N.J., or Creative Technologies Ltd. of Singapore. In yet other embodiments, the computing device 100 is a portable media player or digital audio player supporting file formats including, but not limited to, MP3, WAV, M4A/AAC, WMA Protected AAC, AEFF, Audible audiobook, Apple Lossless audio file formats, and .mov, .m4v, and .mp4 MPEG-4 (H.264/MPEG-4 AVC) video file formats.

In some embodiments, the computing device 100 comprises a combination of devices, such as a mobile phone combined with a digital audio player or portable media player. In one of these embodiments, the computing device 100 is a device in the Google/Motorola line of combination digital audio players and mobile phones. In another of these embodiments, the computing device 100 is a device in the IPHONE smartphone line of devices manufactured by Apple Inc. In still another of these embodiments, the computing device 100 is a device executing the ANDROID open source mobile phone platform distributed by the Open Handset Alliance; for example, the device 100 may be a device such as those provided by Samsung Electronics of Seoul, Korea, or HTC Headquarters of Taiwan, R.O.C. In other embodiments, the computing device 100 is a tablet device such as, for example and without limitation, the IPAD line of devices manufactured by Apple Inc.; the PLAYBOOK manufactured by Research In Motion; the CRUZ line of devices manufactured by Velocity Micro, Inc. of Richmond, Va.; the FOLIO and THRIVE line of devices manufactured by Toshiba America Information Systems, Inc. of Irvine, Calif.; the GALAXY line of devices manufactured by Samsung; the HP SLATE line of devices manufactured by Hewlett-Packard; and the STREAK line of devices manufactured by Dell, Inc. of Round Rock, Tex.

Figure 1D:
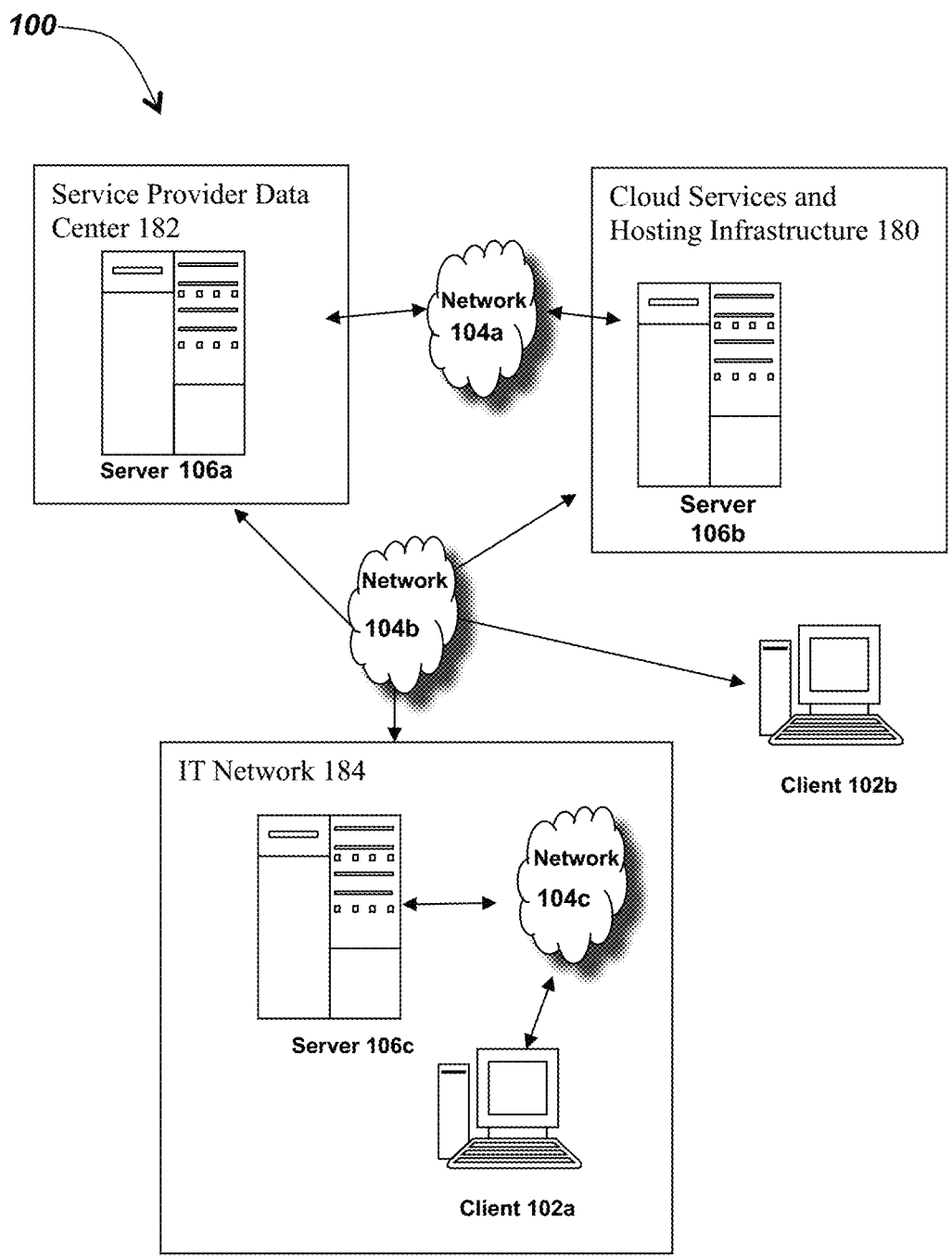
FIG. 1D is a block diagram depicting one embodiment of a system in which a plurality of networks provide data hosting and delivery services.

Referring now to FIG. 1D, a block diagram depicts one embodiment of a system in which a plurality of networks provide hosting and delivery services. In brief overview, the system includes a cloud services and hosting infrastructure 180, a service provider data center 182, and an information technology (IT) network 184.

In one embodiment, the data center 182 includes computing devices such as, without limitation, servers (including, for example, application servers, file servers, databases, and backup servers), routers, switches, and telecommunications equipment. In another embodiment, the cloud services and hosting infrastructure 180 provides access to, without limitation, storage systems, databases, application servers, desktop servers, directory services, web servers, as well as services for accessing remotely located hardware and software platforms. In still other embodiments, the cloud services and hosting infrastructure 180 includes a data center 182. In other embodiments, however, the cloud services and hosting infrastructure 180 relies on services provided by a third-party data center 182. In some embodiments, the IT network 104*c* may provide local services, such as mail services and web services. In other embodiments, the IT network 104*c* may provide local versions of remotely located services, such as locally-cached versions of remotely-located print servers, databases, application servers, desktop servers, directory services, and web servers. In further embodiments, additional servers may reside in the cloud services and hosting infrastructure 180, the data center 182, or other networks altogether, such as those provided by third-party service providers including, without limitation, infrastructure service providers, application service providers, platform service providers, tools service providers, web site hosting services, and desktop service providers.

In one embodiment, a user of a client 102 accesses services provided by a remotely located server 106*a*. For instance, an administrator of an enterprise IT network 184 may determine that a user of the client 102*a* will access an application executing on a virtual machine executing on a remote server 106*a*. As another example, an individual user of a client 102*b* may use a resource provided to consumers by the remotely located server 106 (such as email, fax, voice or other communications service, data backup services, or other service).

As depicted in FIG. 1D, the data center 182 and the cloud services and hosting infrastructure 180 are remotely located from an individual or organization supported by the data center 182 and the cloud services and hosting infrastructure 180; for example, the data center 182 may reside on a first network 104*a* and the cloud services and hosting infrastructure 180 may reside on a second network 104*b*, while the IT network 184 is a separate, third network 104*c*. In other embodiments, the data center 182 and the cloud services and hosting infrastructure 180 reside on a first network 104*a* and the IT network 184 is a separate, second network 104*c*. In still other embodiments, the cloud services and hosting infrastructure 180 resides on a first network 104*a* while the data center 182 and the IT network 184 form a second network 104*c*. Although FIG. 1D depicts only one sever 106*a*, one server 106*b*, one server 106*c*, two clients 102, and three networks 104, it should be understood that the system may provide multiple ones of any or each of those components. The servers 106, clients 102, and networks 104 may be provided as described above in connection with FIGS. 1A-1C.

Therefore, in some embodiments, an IT infrastructure may extend from a first network—such as a network owned and managed by an individual or an enterprise—into a second network, which may be owned or managed by a separate entity than the entity owning or managing the first network. Resources provided by the second network may be said to be "in a cloud." Cloud-resident elements may include, without limitation, storage devices, servers, databases, computing environments (including virtual machines, servers, and desktops), and applications. For example, the IT network 184 may use a remotely located data center 182 to store servers (including, for example, application servers, file servers, databases, and backup servers), routers, switches, and telecommunications equipment. The data center 182 may be owned and managed by the IT network 184 or a third-party service provider (including for example, a cloud services and hosting infrastructure provider) may provide access to a separate data center 182.

In some embodiments, one or more networks providing computing infrastructure on behalf of customers is referred to as a cloud. In one of these embodiments, a system in which users of a first network access at least a second network including a pool of abstracted, scalable, and managed computing resources capable of hosting resources may be referred to as a cloud computing environment. In another of these embodiments, resources may include, without limitation, virtualization technology, data center resources, applications, and management tools. In some embodiments, Internet-based applications (which may be provided via a "software-as-a-service" model) may be referred to as cloud-based resources. In other embodiments, networks that provide users with computing resources, such as remote servers, virtual machines, or blades on blade servers, may be referred to as compute clouds or "infrastructure-as-a-service" providers. In still other embodiments, networks that provide storage resources, such as storage area networks, may be referred to as storage clouds. In further embodiments, a resource may be cached in a local network and stored in a cloud.

In some embodiments, some or all of a plurality of remote machines 106 may be leased or rented from third-party companies such as, by way of example and without limitation, Amazon Web Services LLC of Seattle, Wash.; Rackspace US, Inc. of San Antonio, Tex.; Microsoft Corporation of Redmond, Wash.; and Google Inc. of Mountain View, Calif. In other embodiments, all the hosts 106 are owned and managed by third-party companies including, without limitation, Amazon Web Services LLC, Rackspace US, Inc., Microsoft Corporation, and Google Inc.

Computing resources generally may include, without limitation, physical or virtualized computing components that users' machines 100 may access directly or over a network 104. For example, and without limitation, the computing resources may include computers 100 as described above in connection with FIGS. 1A-1D. By way of further example, the computing resources may include physical computers, virtual computers, virtual computer components (such as hard drives), physical computers (including, by way of example, blades on blade servers or other types of shared or dedicated servers), memory, network devices, databases, input/output systems, operating system software, application software, or any type of software. In other embodiments, the computing resources act as intermediaries and provide access to other remote machines. For example, a first computing resource may provide access to a second machine 106b that executes software made available over the network 104; by way of example, a software-as-a-service provider may execute software on a second machine 106b that a user can access via the first computing resource.

In some embodiments, the methods and systems described herein provide functionality for anomaly identification and information technology infrastructure resource optimization. In one of these embodiments, the methods and systems described herein provide functionality allowing for the identification of anomalies in executing software code that lead to inefficient use of computing resources. In another of these embodiments, identification of anomalies allows for the generation of recommendations for optimizing the use of computing resources. In still another of these embodiments, inefficiencies in software execution or machine operation lead to inefficient use of computing resources; that is, the percentage of any machine 100 and its associated devices used on computation valuable to a user of the machine 100, as opposed to idling, looping, or working on irrelevant or errant activity. In yet another of these embodiments, inefficiencies include, without limitation, CPU loops, memory leaks, disk full, network wait, operating system bugs, rogue software, application software errors, coding errors, and user mistakes. In some embodiments, implementation of the methods and systems described herein provide functionality for optimizing the utilization of computing resources in order to: avoid wasting resources, save on IT expenditures (operating and capital expenditures), predict and avoid IT system outages, optimize execution of large IT projects, model and optimize future IT asset use, and improve IT operational productivity by eliminating delays caused by anomalies and performance bottlenecks or congestion.

Figure 2:
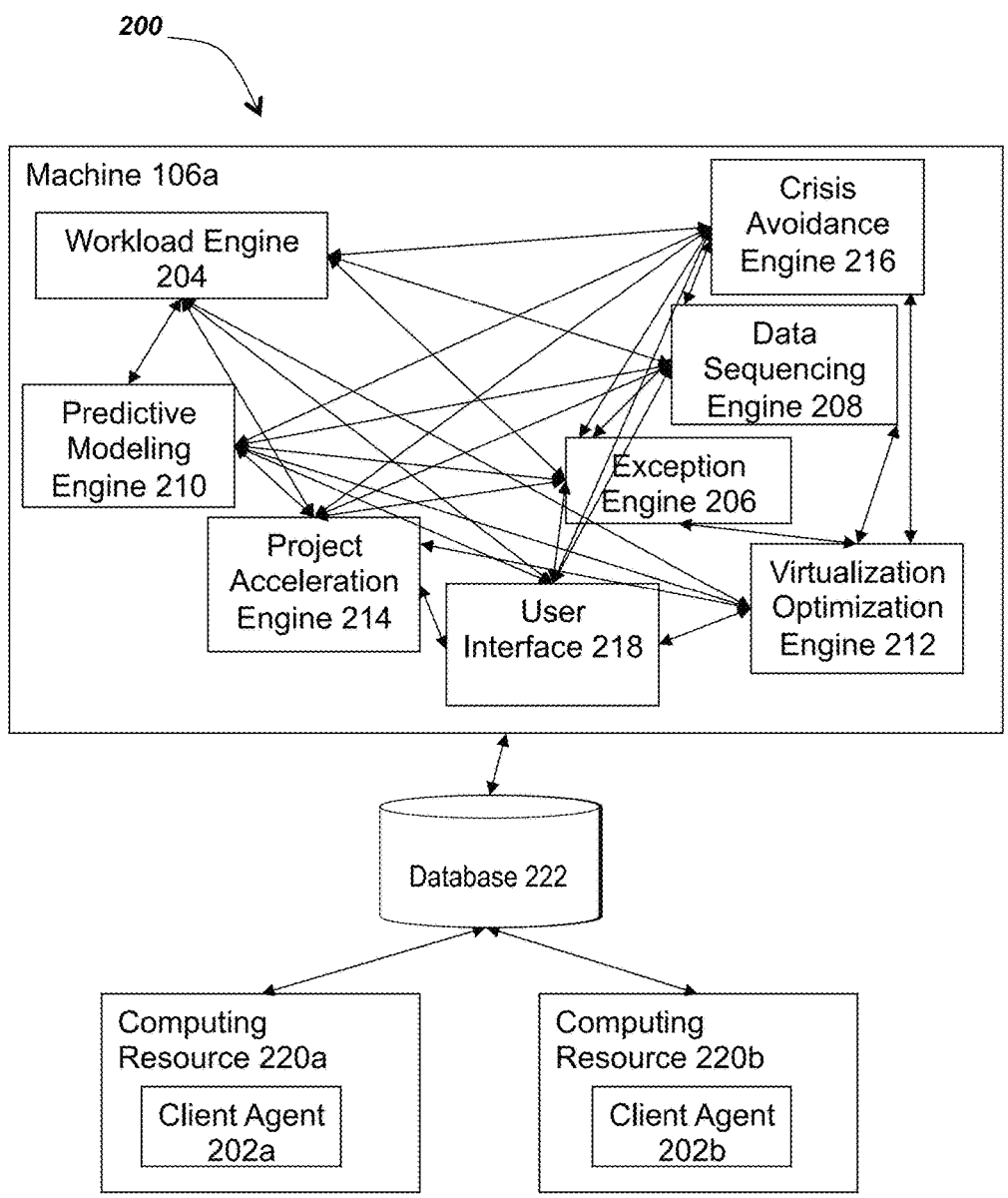
FIG. 2 is a block diagram depicting an embodiment of a system for anomaly identification and information technology infrastructure resource optimization.

Referring now to FIG. 2, a block diagram depicts one embodiment of a system for anomaly identification and information technology infrastructure resource optimization. In brief overview, the system includes a machine 106a, a database 222, and a plurality of computing resources 220a-n (referred to generally as a computing resource 220). The system includes a plurality of client agents 202a-n (referred to generally as a client agent 202), a workload engine 204, an exception engine 206, a data sequencing engine 208, a predictive modeling engine 210, a virtualization optimization engine 212, a project acceleration engine 214, a crisis avoidance engine 216, and a user interface 218.

In some embodiments, the client agent 202 is a software program. In one of these embodiments, a client agent 202 is a low impact software module integrated into a computing resource 220. In other embodiments, the client agent 202 is a hardware module. In still other embodiments, the client agent 202 executes on a computing resource 220a. In further embodiments, a client agent 202a-n executes on each computing resource 220a-n in a network 104.

In one embodiment, the client agent 202 collects data about computer resource consumption for each running process of the computing resource 220a, including, without limitation, usage of CPUs, memory, disk space, I/O, and network resources. In another embodiment, the client agent 202 is dynamically selective about what data it gathers based on resource optimization algorithms for detecting anomalies and performance bottlenecks. The client agent 202 may be dynamically selective about both what and when it collects data. In still another embodiment, the client agent 202 includes functionality for pre-processing gathered data, including categorizing and synthesizing data, prior to entering the gathered data in the database 222, saving only what is needed for problem detection, display to users, and modeling. Data gathered by the client agent 202 may include software operation data. Data gathered by the client agent 202 may be referred to as metrics. In some embodiments, the gathered data is associated with a process executed by the computing resource. In one of these embodiments, the gathered data may include a process name for such a process. By way of example, and without limitation, the gathered metrics may include a full name of the process. As another non-limiting example, the gathered metrics may include a full command stream, which may include a name of an application or process that launched the process. After gathering process name metrics, the client agent 202 may append other gathered metrics to process name metrics. For example, without limitation, the client agent 202 may generate a table (or populate a data structure in the database 222) containing the process name and each appended gathered metric.

In some embodiments, data gathered by the client agent 202 may include resource-wide metrics and process-specific metrics. Resource-wide metrics may include, without limitation, identification of CPU, RAM, hard disk drives, and network cards. Resource-wide metrics may also include, without limitation, utilization data of identified resources. Process-specific metrics may include identification of specific programs (operating system, application, or other types of programs), that are installed and/or executing on a computing resource.

In some embodiments, and as will be described in greater detail below in connection with FIG. 3, the client agent 202 includes functionality for compressing gathered metrics. In one of these embodiments, the data compression functionality allows other components (local or remote via networks) accessing the data to run rapidly. In other embodiments, as will be discussed in greater detail below, the client agent 202 also includes functionality for preprocessing the gathered metrics.

The workload engine 204 may provide functionality for automated workload characterization. In some embodiments, the workload engine 204 is a software program. In other embodiments, the workload engine 204 is a hardware module. In further embodiments, the workload engine 204 executes on the machine 106a.

In some embodiments, the exception engine 206 is a software program. In other embodiments, the exception engine 206 is a hardware module. In further embodiments, the exception engine 206 executes on the machine 106a.

In one embodiment, the data sequencing engine 208 loads and processes data generated by other engines in the system 200 into a multi-level, multi-purpose user interface 218. In another embodiment, the data sequencing engine 208 provides prioritized optimization discoveries and recommendations on a multitude of key operational measurements. In one embodiment, the data sequencing engine 208 generates data used to populate the user interface 218. For example, the data sequencing engine 208 may generate graphics, handle the details of node clustering, or perform database consolidation. In another embodiment, the data sequencing engine 208 provides a database interface for one or more data collectors. In some embodiments, the data sequencing engine 208 is a software program. In other embodiments, the data sequencing engine 208 is a hardware module. In further embodiments, the data sequencing engine 208 executes on the machine 106a.

In one embodiment, the user interface 218 has two components: a user's "home base" and information specifically about a particular computer. The home base may allow users to quickly view any notifications for computers they have expressed interest in (e.g., subscribed to), as well as single click access to more specific information about any computer. The home base also lets expert users modify various system components, such as workload characterization and creating exceptions for rules. The report interface for a computer lets the user quickly view resource usage for any computer component from different perspectives. It provides a tab interface by resource type (CPU, Memory, Disk, etc.) and menu selection to instantly switch between/across different workload views (Class, Group, User, Process). Data can be viewed at different time scales, and developing trends can be easily seen from small timeline graphs that show historical data. Consistent and user-adjustable workload colorization, included in help, notifications, and hover text, makes it possible to rapidly assimilate the available views. In some embodiments, colorization is matched to prioritize anomalies identified by the system 200. For example, colorized hovertext lets users quickly see the exact numerical value for a graphed workload, even if it is one of a dozen or more depicted in a single graph bar. Built-in help provides tailored analysis of what the data means, and notifications point out any potential problems that are likely to be of primary interest. This help is not just general information about graphs and resources, but is customized by the actual data being viewed, and so can pre-emptively make suggestions for mitigating anomalies, such as the need to analyze application design choices and configuration choices, or move a batch process to a different time of day. In one embodiment of the user interface, data is presented in aggregate form, by day, week, month, or some user decided amount. This data may then be further annotated by workload, a unique method of presentation available because of the way processes are characterized as described herein. This enables actionable responses by the clients. In some embodiments, additional interfaces are provided. For example, power users or software development personnel (or associated roles) may receive access to alternative or additional interfaces.

In one embodiment, the predictive modeling engine 210 analyzes data generated by the exception engine 206 to model current and future capacity needs of computing resources, to predict failures, and allow for optimized additions of resources. In some embodiments, the predictive modeling engine 210 is a software program. In other embodiments, the predictive modeling engine 210 is a hardware module. In further embodiments, the predictive modeling engine 210 executes on the machine 106a.

In one embodiment, the predictive modeling engine 210 generates data that, when displayed to a user via a user interface, allows users to forecast how changes in hardware, software scheduling, or user demand will impact perceived system response time, and thus resource loading, purchasing decisions, and most importantly delays in user response time and productivity loss. In some embodiments, the predictive modeling engine 210 focuses on performance aspects of the system and provides indications on when the system and workload response time will become an issue. Being able to rapidly test various potential changes lets users quickly focus on the most cost effective solution to any perceived performance problems, or to correctly anticipate future needs before they become current problems. This includes bottlenecks or delays that can impact company operations up to and including dangerous and expensive conditions such as a manufacturing shutdown or customer website outage. Intuitive and rapid controls, and built-in expert analysis, allow users to quickly understand and address many performance issues before involving any IT professionals, reducing overall support costs. In one embodiment, the predictive modeling engine 210 can analyze the actual work being done and predict percentage growth possible on current hardware and other likely changes (like adding CPU, memory, IO to disk and/or network bandwidth). In layman's terms, the system answers the question, "where is the 'knee in the curve'?" In another embodiment, the system 200 informs users with specific actionable information such as "Current hardware can support a 39% growth in the application before hitting the first performance reducing bottleneck, the overloaded D: drive." Subsequently, if a user chooses to mitigate the drive issue by introducing a faster drive, or either reducing (e.g., in a hypothetical case where the system notes that 88% of the I/Os are to a file called "giant_useless.log") or spreading the I/Os over more physical paths, the next bottleneck will be network bandwidth at 82% growth when users overwhelm the current installed network bandwidth. In still another embodiment, the system 200 provides users with a checklist of each resource that the application could run out of, and tells the user how much growth it would take to hit that potential bottleneck.

In one embodiment, the virtualization optimization engine 212 includes functionality for reanalyzing and reusing previously processed data resulting from analyses by the workflow engine 204 and the exception engine 206 to optimize the number and utility of virtual servers in a network. In some embodiments, the virtualization optimization engine 212 is a software program. In other embodiments, the virtualization optimization engine 212 is a hardware module. In further embodiments, the virtualization optimization engine 212 executes on the machine 106a.

In one embodiment, the project acceleration engine 214 analyzes data from the workload engine 204 and the exception engine 206 to identify or pre-emptively identify or predict failure points in server/software installations/integration activities. In some embodiments, the project acceleration engine 214 is a software program. In other embodiments, the project acceleration engine 214 is a hardware module. In further embodiments, the project acceleration engine 214 executes on the machine 106a.

In one embodiment, the crisis avoidance engine 216 analyzes data from the workload engine 204 and the exception engine 206 to identify or pre-emptively identify or predict the causes of computing resource shutdown. In some embodiments, the crisis avoidance engine 216 is a software program. In other embodiments, the crisis avoidance engine 216 is a hardware module. In further embodiments, the crisis avoidance engine 216 executes on the machine 106a.

In some embodiments, examples of databases 222 include, without limitation, structured storage (e.g., NOSQL-type databases and BigTable databases), HBase databases distributed by The Apache Software Foundation of Forest Hill, Md., MongoDB databases distributed by 10Gen, Inc., of New York, N.Y., Cassandra databases distributed by The Apache Software Foundation, and document-based databases. In embodiments in which the database 222 is a NOSQL database, the system 200 may benefit from the more flexible storage structure of this type of database, as well as the security, fault-tolerance, and scalability features of this type of database. In other embodiments, the database 222 is an ODBC-compliant database. For example, the database 222 may be provided as an ORACLE database manufactured by Oracle Corporation of Redwood City, Calif. In other embodiments, the database 222 can be a MICROSOFT ACCESS database or a Microsoft SQL server database manufactured by Microsoft Corporation of Redmond, Wash. In still other embodiments, the database 222 may be a custom-designed database based on an open source database, such as the MYSQL family of freely available database products distributed by Oracle Corporation of Redwood City, Calif. In further embodiments, the database may be any form or type of database.

In one embodiment, the computing resources 220a-n are part of a first network 104. The machine 106a executing on the various engines described in connection with FIG. 2 may be a computing resource 220a (e.g., a physical or virtual server) within the first network 104. Alternatively, the machine 106a may be a computing resource on a second network 104b (not shown).

Although referred to herein as engines and components, the elements depicted in FIG. 2 may each be provided as software, hardware, or a combination of the two, and may execute on one or more machines 100 as described above in FIGS. 1A-1D. Although certain components described herein are depicted as separate entities, for ease of discussion, it should be understood that this does not restrict the architecture to a particular implementation. For instance, the functionality of some or all of the described components may be encompassed by a single circuit, software function, or an appliance; as another example, the functionality of one or more components may be distributed across multiple components.

Figure 3:
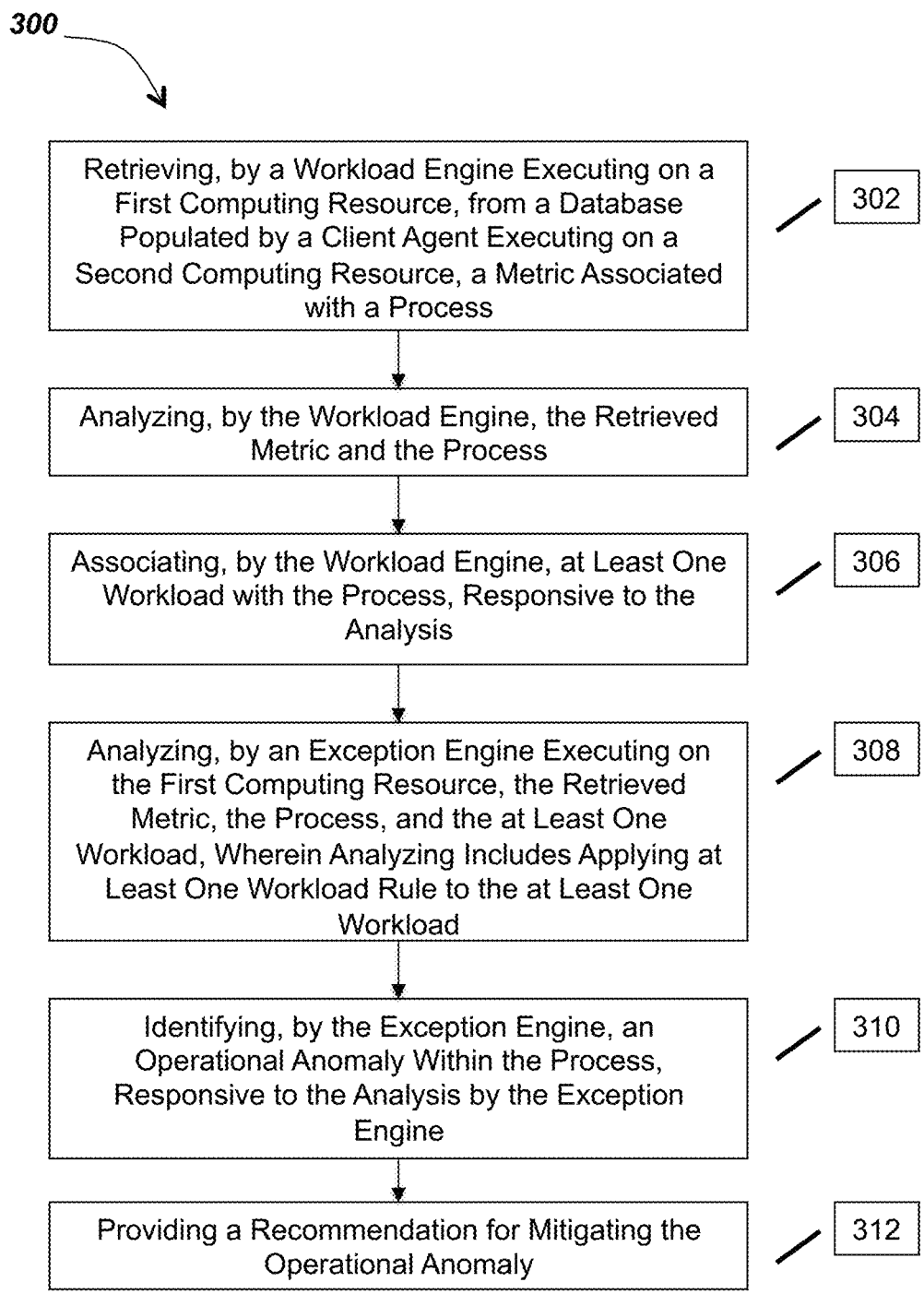
FIG. 3 is a flow diagram depicting an embodiment of a method for anomaly identification and information technology infrastructure resource optimization.

Referring now to FIG. 3, a flow diagram depicts one embodiment of a method 300 for anomaly identification and IT resource optimization. In brief overview, the method 300 includes retrieving, by a workload engine executing on a first computing resource, from a database populated by a client agent executing on a second computing resource, a metric associated with a process (302). The method 300 includes analyzing, by the workload engine, the retrieved metric and the process (304). The method 300 includes associating, by the workload engine, at least one workload with the process, responsive to the analysis (306). The method 300 includes analyzing, by an exception engine executing on the first computing resource, the retrieved metric, the process, and the at least one workload; analyzing includes applying at least one workload rule to the at least one workload (308). The method 300 includes identifying, by the exception engine, an operational anomaly within the process, responsive to the analysis by the exception engine (310). The method 300 includes providing a recommendation for mitigating the operational anomaly (312). The method may include providing a recommendation for mitigating a performance bottleneck.

Referring now to FIG. 3 in greater detail, and in connection with FIG. 2, the method 300 includes retrieving, by a workload engine executing on a first computing resource, from a database populated by a client agent executing on a second computing resource, a metric associated with a process (302). The first computing resource executing the workload engine 204 may be the machine 106a.

In some embodiments, the method 300 includes gathering, by the client agent 202a executing on the second computing resource 220a, at least one metric from the second computing resource 220a. In one of these embodiments, the method 300 includes preprocessing, by the client agent 202a, the retrieved metric before populating the database with the metric. In another of these embodiments, the method 300 includes storing, by the client agent 202a, in the database 222, the preprocessed metric. The client agent 202 may access and preprocess metrics retrieved from any type of computing resource, which, as described above, may include a wide variety of hardware and software components. In some embodiments, the client agent 202 periodically runs an industry standard benchmark to evaluate computing resources, providing benefits when managing virtual machines and resources available to virtual machines and when modeling virtual machine performance.

In one embodiment, the client agent 202 performs frequent sampling to retrieve statistically valid, random samples. In some embodiments, the client agent 202 continuously retrieves metrics from the second computing resource 220a. In one of these embodiments, the client agent 202 refreshes the database 222 with newly retrieved metrics. In some embodiments, the client agent 202 retrieves the metrics from the operating system of the second computing resource 220a. Some metrics are point measurements in time (e.g., substantially instantaneous). Other metrics are calculated over periods of time to determine a total level of consumption of a resource (e.g., accumulative).

The client agent 202 may collect the data at statistically valid sampling intervals, randomizing the exact sample time (e.g., randomizing intervals between sampling) to avoid missing periodically run processes. A tension when gathering sampling data arises between maximizing coverage and minimizing cost. The client agent 202 may resolve this by executing functionality that automatically adjusts the sampling interval to maximize the capture ratio (percentage of active processes caught during a sampling interval) and minimizing the cost (e.g., the CPU time used by the client agent 202 itself). Such functionality may be referred to as an "auto-adjusting scanning frequency" or a "thermostat." In one embodiment, the client agent 202 determines the following, by way of example, and without limitation: if Sum (process1 usage . . . process M usage)/Sum (processor1 usage . . . processorN usage)<K then SamplingFrequency*=F as long as P<maxP, where usage is % cpu used during a sampling interval, K is the user adjustable sensitivity (0<K<100) and F is sampling frequency adjustment (0<F<1.0), P is the CPU time used by the client agent during the sampling interval, and maxP is the user adjustable maximum cost (0<maxP<100), If CPU time used P exceeds maxP, then sampling frequency F is reduced by a parameter set amount (which is configurable by a user, predefined, or automatically adjusted based on a variety of factors), and iteratively re-calculated until P is less than maxP, thereby reducing the sampling frequency F such that P<maxP. After some parameter set time has elapsed, P will be compared to maxP, and if P is less than maxP by some parameter set amount, the sampling frequency F is increased by a parameter set amount, and iteratively re-calculated until the capture ratio returns to some desired parameter set value.

In another embodiment, sampling intervals are kept relatively short to keep capture ratios high, but they are then aggregated into larger time periods (spill intervals) before being saved. In some embodiments, between 50 and 1000 samples are typically coalesced into a single data recording, depending on system activity, "thermostat" adjustment, and user input.

In some embodiments, the client agent 202 includes functionality for automatically adjusting a scanning frequency by determining whether a rate of CPU utilization for scanning is greater than a predetermined threshold and, if so, the client agent 202 increases a scanning interval. The client agent 202 may also determine whether a ratio at which data is captured is less than a predetermined threshold and whether the total CPU usage is less than a predetermined threshold and, if so, the client agent 202 reduces a scanning interval. The client agent 202 may determine if a total CPU usage is less than or equal to a threshold amount of CPU usage and if a scanning interval is greater than a predetermined scanning interval and, if so, the client agent 202 may reset the scanning interval to match the predetermined scanning interval.

In one embodiment, as indicated above, the client agent 202 preprocesses metrics for use by the machine 106 in building a historical model based on the metrics.

In one embodiment, the client agent 202 compresses processed data. In another embodiment, the client agent 202 determines whether to keep or discard processed data. For example, it is common to have software run a series of processes in sequence or in parallel, each differing from the others only by their particular resource consumption and their process ID. The client agent 202 may collapse some or all of those processes into a single data instance, optionally saving only their associated process IDs (e.g., not saving those if the resource consumption of the processes is sufficiently low that they are unlikely to be needed in problem detection). Inactive processes that are low memory consumers (e.g., with little CPU usage, no I/O and/or no network activities) are not recorded at all, instead being collapsed into a single, "idle" process. As another example, it is common to collect and report thousands of measurements or metrics for individual servers. In some embodiments, however, less than 5% of available metrics are needed to analyze performance, identify anomalies and cost reduction opportunities, and accurately model server performance. Further, these metrics may be handled in ways to compress the size of the data footprint and increase processing speed, while retaining the meaningful information as described above. Therefore, the client agent 202 may selectively discard some of the retrieved data. Alternatively, rather than discarding retrieved data, the data is mathematically condensed such that the value of the data is retained. For example, the client agent 202 may sample a level of CPU consumption by a process and retrieve a plurality of metrics (e.g., 30% of the CPU, 20%, 20%, 40%, 40%, 0%, 60%, etc.); the client agent 202 may calculate an average of 30% of CPU consumption throughout the time period and may then return to the database an indication of a start time, an end time, a process name, and the value 30%.

In one embodiment, the client agent 202 collects (and populates into a database) a subset (for example, and without limitation, less than 5%) of available sampling metrics (both subject and time-related data), minimizing redundancies and recording information that is known (e.g., from prior expert experience) to either (a) impact perceived user response time or (b) is needed for process workload classification (e.g., to improve a classification process). These data are selected dynamically and recorded because they, for example, point to potential problems or are needed to correctly model the system via queuing theory. This selectivity results in a constrained dataset that nevertheless is able to drive highly accurate analytical results far more comprehensively and faster than conventional approaches, which facilitates lower equipment, software, and support costs for running the methods and systems described herein. Traditional performance management tools collect all available operating system and/or application metrics/data for real time monitoring and/or store them as historical analysis. Those tools use significant amounts of computing power and storage space. In contrast, the client agent 202 collects performance metrics dynamically based on the needs of algorithms for anomaly identification/detection, capacity planning, and performance prediction; in some embodiments, the client agent 202 does not collect metrics or data if the data will not be used by any of the components shown in FIG. 2. Therefore, for a given time interval, a very small subset of data may be collected for analysis. In one embodiment, for example, and without limitation, only about 5% to 10% of the available performance data is collected as inputs to the analytical algorithms. This dynamic or need-based data collection method is more efficient for computation as well as for data management.

In one embodiment, the client agent 202 optimizes collected data for modeling. As discussed above, in some embodiments, the client agent 202 only collects data used by modeling algorithms at the right sampling interval based on the nature of the processes: if there are many long-lasting processes, the client agent samples at lower frequency; for many short-lived processes, the client agent samples at higher frequency. The sampling interval may be dynamically adjusted based on the "capture ratio" as well as the sampling overhead. In another embodiment, the client agent 202 gathers key identification metrics for each process executed by a computing resource. In still another embodiment, the client agent 202 separates metrics into metrics that are vital and metrics that are situational. Vital metrics may include name, execution path, description, and user. Situational metrics may include parent process and command line. Situational metrics may be gathered when specifically required by a user for a particular computing resource. Situational metrics may vary widely between similar processes so in some embodiments ignoring them makes process identification metrics more homogeneous.

In one embodiment, the client agent 202 normalizes gathered metrics. For example, the client agent 202 may put gathered metrics into a canonical form for easier comparison. For instance, the client agent 202 may remove common differences in execution path, differences in alphabetic case, and operating system idiosyncrasies, such as differing path delimiters.

In another embodiment, the client agent 202 generates at least one fingerprint of the gathered metrics. For example, the client agent 202 may hash gathered metrics into a unique value, which is used as a key for identifying similar processes.

In still another embodiment, the client agent 202 coalesces processes with identical fingerprints into a single master process (via hash table consolidation), with resource usage information aggregated but unique process identifiers retained for problem detection.

In another embodiment, the client agent 202 filters (e.g., further coalesces) processes with little resource consumption (little or no CPU usage, no network or disk I/O, low memory usage) into a single, "idle" process. In some embodiments, the client agent 202 provides secure data transfer of the gathered metrics to the database 222.

In some embodiments, optimization, normalizing, fingerprinting, coalescing, and filtering of gathered metrics by the client agent 202 provides a fast, efficient means for gathering and preprocessing metrics with increased data compression and a corresponding speedup in subsequent analyses. In one of these embodiments, by deploying a plurality of client agents 202a-n across a plurality of computing resources 220a-n, with each client agent 202 providing preprocessing of metrics data, the computational load of gathering and processing metrics data is distributed throughout a network 104.

In some embodiments, the client agent 202 retrieves instructions from the database. In one of these embodiments, the client agent 202 receives a confirmation of successful receipt and backing up of metric data. The client agent 202 may delete metric data on the computing resource 220a once the database 222 confirms receipt of the metric data.

In some embodiments, both the client agent 202 and the workload engine 204 perform at least a part of the preprocessing needed before workload characterization is performed. In other embodiments, the workload engine 204 receives the metric data from the client agent 202 and performs the preprocessing prior to adding the metric data to the database 222 (for example, in some instances, a computing resource 220 may not be able to access the database 222 directly and so instead the client agent 202 executing on that computing resource 220 transmits gathered data to an ingest agent executing on machine 106, which then preprocesses the data as described above). In still another embodiment, the data analysis (e.g., assignment of workloads and identification of anomalies and mitigating actions) occurs at the point where the data is stored, regardless of whether that is at the database 222 or elsewhere (e.g., on the computing resource 220). In other embodiments, preprocessing will vastly decrease details kept for essentially insignificant consumers, reducing collection overhead and storage requirements. Such an embodiment may keep more details for significant consumers and processes whose resource usage patterns fall into the ranges for possible anomaly consideration or significant performance events.

In some embodiments, the client agent 202, the workload engine 204, or both, categorizes the gathered data into workloads. For example, in some embodiments, the client agent 202 performs processing. In one of these embodiments, the client agent 202 is responsible for collapsing "like" processes, and performs characterization in order to know when to do this collapsing. In another of these embodiments, this client-side preprocessing allows the system to detect certain types of loops, other anomalies, and interesting and significant processing behavior. In one embodiment, workloads are semantic categories for processes, representing things like origin, purpose, and resource consumption pattern for CPU, disks, memory, networks, and other virtual and physical devices or machines. In another embodiment, detection, presentation, and modeling are oriented around processing information related to workloads, which allows the system 200 to detect and subsequently mitigate or manage operational and performance anomalies. In still another embodiment, the system 200 has a workload orientation throughout, including at the point of data collection. In another embodiment, workloads are a higher level of classification, more recognizable and natural to end-users. In some embodiments, by providing rapid, extensible, and high-quality automated workload classification, the system 200 provides expert guidance to noticing and understanding current and/or future problems. In one of these embodiments, the system 200 categorizes processes into multiple workloads, which enables both faster and more comprehensive detection of operational and performance anomalies. In some embodiments, workloads are created to describe application resource consumption, be it for reporting, chargeback or predictive reasons; different uses may request different display methods and different details, but the goal is to regroup the information from potentially many processes in useful ways. The systems and methods described herein may use workloads both for the identification of a current system state (e.g., by applying workload rules to workloads in order to identify anomalies) but also to predict future performance or capacity issues.

By way of example, performance metrics gathered by the client agent 202 may include an identification of a process and the process is then associated with a workload. For example, Workload1={process11, process12, . . . , process1$n$}; Workload2={process21, process22, . . . , process2$m$} . . . Workloadp={processp1, processp2, . . . , processpq}. Each process consumes one or more computing resources such as, without limitation, CPU utilization, process service time, processor performance rating, disk utilization, disk read/write ratio, disk service time and space, memory utilization, private pages and public pages, page fault rate, network utilization, throughput, and packet size. Processes running in the systems may be grouped into workloads based on process functions. If some processes in a workload generate exceptions, so will the workload. Workloads characterize the behavior of both system and application software. Workloads may also capture the performance aspects of application software and system in terms of current and future response time, throughput, and delay.

The method 300 includes analyzing, by the workload engine, the retrieved metric and the process (304). In one embodiment, the workload engine 204 performs workload analysis via workload rules ordered in rule sets; rule sets may be ordered lists of rules. In one embodiment, rule sets are regular expression matches on process identifier metrics that trigger assignment of a workload to the process (the use of regular expressions will be understood by one of ordinary skill in the art). In another embodiment, rule sets include Boolean logic (e.g., if/then/else statements). In some embodiments, rules are run iteratively and can refer to, and modify the results of, previously run rules. In other embodiments, because rules are organized into rule sets, the majority of them can be shared between different implementations of the system 200 (e.g., between different companies that each implement the system 200), reducing the effort required by individual implementers. By way of example, a workload rule may specify that if a plurality of processes, which are associated with a workload and related to a base application, consume an excess of a threshold (e.g., "more than 97% AND less than 100% of a CPU for at least eight continuous hours" for a multiprocessor system), the system 200 should issue an alert. As another example, a workload rule may specify that if a workload has an I/O wait exceeding a threshold time and if there is at least one disk drive available to a computing resource 220 executing processes associated with the workload, the system 200 should issue an alert (e.g., IF workload FrogBat has I/O wait exceeding threshold time T, AND the number of disk drives available to the server processing FrogBat is greater than 1, AND IF the I/O is greater than 80% of the I/O rated speed for any of the drives, AND IF the I/O is less than 20% of the rated speed for any of the drives, THEN issue Alert with text including: "Please re-balance your I/O to drive XYZ which is underutilized and away from drive ABC which is over-utilized.").

Conventionally, workload analysis typically assigns a single workload to each process that will be modeled. This means the conventional modeler must decide whether a particular process should be viewed as a unique process, a part of a software package, a part of a user's batch process run, as fulfilling a purpose (e.g., "antivirus"), or having usage characteristics (such as "batch" or "Gaussian"). Conventionally, viewing the process as part of a different workload requires reassignment and rerunning of the model.

In contrast, implementation of the methods and systems described herein provides functionality for automated workload characterization that automatically assigns at least one workload (and, in some embodiments, a plurality of workloads) to each process, capturing all of the above possible classifications, as well as others (e.g., Vendor, Author, Comment). Having multiple workloads for each process allows the system 200 to additionally tag processes with consumptive workloads, useful for modeling, and information like an identification of a software vendor, not normally captured during process acquisition, as well as allowing for the use of terms in the user's vocabulary, like "antivirus" rather than "CNTAoSMgr." This allows the system 200 to detect problems at various conceptual levels, provide more expert guidance when problems arise, and let users effortlessly view consumption patterns for different workload models. With thousands of changing workloads, this process requires sophisticated statistical training and may be practically impossible to perform without an automated process, due to the amount of time a manual effort would require and tremendous consistency errors humans would introduce if they attempted to provide a manual workload profiling process.

In one embodiment, workloads provide a way to establish context with a (human) viewer. Sometimes the viewer wants to see all of the processes running on their machine by vendors. Sometimes they want more detail, such as "What subpart of the vendor software used all of these resources?" Each of these leads to a different workload characterization, as they have different purposes. In another embodiment, workload characterizations are a set of criteria to match on, such as process name, path to the process, user name, user domain, or parent process. The output is a name for the process, identifying a type and general name, e.g., class_backup or group_sap. Further, some embodiments may automatically build a time display of how a particular resultant name (e.g., class_backup) uses a particular computer resource, such as disk IO or CPU percentage. These displays may answer the most useful and actionable questions in advance, so the user just has to look at a web page to quickly answer a question regarding an anomaly, performance, and/or capacity question, thus freeing up time previously spent collecting and analyzing data.

The method 300 includes associating, by the workload engine, at least one workload with the process, responsive to the analysis (306). In one embodiment, and as discussed above, the workload engine 204 applies one or more rules to determine whether to associate a workload with the process (e.g., applying at least one rule to at least one attribute of the process to determine whether to make the association). As indicated above, in some embodiments, the client agent 202 may populate a data structure in the database 222 containing a process name and each appended gathered metric associated with the process name. In some embodiments, the workload engine 204 may create one or more workloads around each process. In one of these embodiments, the workload engine 204 may store workload identifiers or other data associated with the process name in the data structure. By way of example, the workload engine 204 may associate a workload with the process name indicating that the process has a particular type, e.g., an antivirus; in such an example, a user viewing all processes associated with the workload may determine that antivirus software is consuming, for example, five times the resources of the underlying process and take appropriate action. Examples of appropriate actions include, without limitation, establishing a rule requesting the triggering of a notification if the type of process exceeds a threshold level of resource consumption or determining that a different type of process should be used (e.g., a different application that does not consume so many resources). As another example, the workload engine 204 may associate a workload with the process name identifying a specific application that launched the process; in such an example, a user viewing a list of process names associated with the workload may determine that the identified application launched an unusually high number of processes and, as a result, one application (the identified application) is consuming an unusually high percentage of CPU resources. By allowing one or more workloads to be automatically associated with each process in a network, the system 200 and method 300 allow users to view different aspects of IT resource consumption and provide insights useful in creating workload rules that provide meaningful, dynamic notifications and recommendations.

In some embodiments, the methods and systems described herein include a workload-centric view of data, such as resource consumption and reporting of problems. In such embodiments, workloads provide an extensible categorization of processes into useful, intuitive categories or classes; such workloads are extensible horizontally and vertically. For example, new values can be added to any workload category or class, either automatically or by a user (vertical extensibility). As another example, the system may analyze an execution path of a process and decide to assign the process a "group" workload value of "AvantguardQuantum." As another example, a customer may create a new value such as "ITCustomProcess." As a further example, new workload categories can be added without requiring modifications to software code (horizontal extensibility); for example, a customer might add a "SupportContact" category, with values being the email addresses of IT support personnel to contact in the event a process causes a problem.

In some embodiments, workloads are defined by looking at sets of process metrics. In one of these embodiments, possible candidates include process name, executable path, description (as defined in MS Windows FileVersionInfo), invoking command line, user name, node name, and workloads of the parent process; which of these metrics is used can be customized for different processes (and the customization can be different for different sets of nodes). The system may store rules for how to analyze the metrics to produce workload in prioritized rule sets, facilitating the sharing of the rules as well as enhancements for the rules from users in a customer base. In some embodiments, once workloads are assigned for a set of process metric values, the results are stored for rapid access and sharing by computing a unique number that represents that particular combination of metric values; any future process that has the same set of metric values will receive the same workload without redoing the workload analysis, i.e., without a code change.

The method 300 includes analyzing, by an exception engine executing on the first computing resource, the retrieved metric, the process, and the at least one workload, wherein analyzing further comprises applying at least one workload rule to the at least one workload (308). In one embodiment, the exception engine 206 analyzes the retrieved metric and the process. In another embodiment, the exception engine 206 also analyzes the associated at least one workload. One of ordinary skill in the art will understand that all referenced as "the received metric" for ease of discussion, multiple metrics may be analyzed; for example, combinations of metrics may be analyzed or analysis of one metric value may determine whether the exception engine decides to analyze additional metrics. By way of further example, the exception engine 206 may determine only to report a network retransmission problem if there is sufficient underlying network traffic (e.g., a sufficient number of metric values satisfying a predetermined threshold) to make the notification useful to a user. In still another embodiment, the exception engine 206 analyzes a capacity and/or performance variable of the metric. For example, capacity variables may include a number of MIPs available from a CPU on a particular server (e.g., a level of capacity or the number of active processors of the server) or a network I/O capacity of a server. In yet another embodiment, the exception engine 206 analyzes a utilization variable of the computing resource 220a from which the client agent 202a retrieved the metric. In some embodiments, the exception engine 206 systematically and continuously applies an analytical approach to the incoming data in order to identify operational and/or performance anomalies. In some embodiments, by computing workload response time, including without limitation, response times at CPU, disk/IO, memory, and network device levels, using queuing performance models with dynamically selected performance metrics, the systems and methods described herein provide a comprehensive approach to analyzing and predicting current and future system and application behavior. As opposed to, for example, conventional load balancing systems, which make short-term adjustments regarding routing of data for processing amongst a plurality of machines, the workload-based approach described herein allows for addressing application performance problems that cannot be solved merely by balancing load (for example, addressing an application memory leak), as well for addressing not just short-term routing issues but predicting future response times and capacity issues.

In one embodiment, the exception engine 206 scans workload information associated with at least one computing resource 220a for potential anomalies. In another embodiment, the exception engine 206 uses an extensible rules engine to compare workload information to historical norms and absolute references, using decision-based rules (e.g., rules defined by administrators, users, experts, or others) and historical data. The exception engine 206 may then apply at least one workload rule to the at least one workload.

Rules can target different levels of granularity, some focusing on user level concepts ("Are we using too much CPU backing up the system?") and others on the process level ("Is a process in an infinite loop?"). In one embodiment, the rules engine is not hardwired but flexible and user definable. In another embodiment, multiple rules may be applied per process, providing improved problem definitions. The following is one non-limiting example of a rule:

```
Rule: Excessive Memory Usage
Condition: Memory Commit % >= 75%
Triggers:
Severity 30, Memory Use 70%, Duration 480 minutes
Severity 70, Memory Use 90%, Duration 480 minutes
Exceptions:
Level Any, Node Any, OS Any, Workload Class_Database, Memory Use 99%
Level Any, Node USAMA047, OS Any Workload Group_Modeling, Memory Use 100%
Template:
<a href="<WEBHOST>/MemoryReport?name=<NODE>&workload=
```

-continued

```
byGroup&date=<FILENAMEDATE> "target="_blank">Consumed <b><MEMORY> percent </b> of available memory with commit percent of <b><COMMIT></b> from <STARTTIME> to <ENDTIME>. <span style="color : <COLOR>"> <WORKLOAD></span> used <b><WORKLOADMEMORY> percent</b></a> <i><ADVICE></i>
```

As another example, a rule such as the following may be executed once per day per node, after the day's metrics have been collected:

```
minDaysLeaking = kMinDaysLeakingDefault
disabled = false
if process p has an exception (using process workloads, node name, node cluster list)
    minDaysLeaking = exceptions[minDaysLeaking]
    disabled = exceptions[disabled]
end if
if (dayCount >= minDaysLeaking and not disabled)
    NotifyOfLoop (severity calculated based on dayCount, totalMemoryChange, and exceptions)
end if.
```

The method 300 includes identifying, by the exception engine, an operational or performance anomaly within the process, responsive to the analysis by the exception engine (310). In one embodiment, the exception engine 206 makes the identification responsive to the analysis by the exception engine 206 described above. In one embodiment, the exception engine 206 determines that a rule includes an identification of the operational or performance anomaly. In another embodiment, the exception engine 206 determines that a rule includes an identification of a resource storing an identification of the operational or performance anomaly (e.g., a table or database listing the operational or performance anomaly).

In one embodiment, the exception engine 206 utilizes different rules for identifying different types of anomalies. For example, and without limitation, a rule such as the following might be used to detect a full disk:

```
LineInfo = GetLinearRegression (spaceAvailable, date, today)
    if (LineInfo.fSlope < 0)
        daysUntilFull = LineInfo.fXIntercept
        confidence = ComputeConfidence (LineInfo)
        if (ShouldNotify (node name, cluster, disk name, daysUntilFull, confidence))
            NotifyOfDiskFilling (severity calculated based on daysUntilFull, confidence , nodeCluster, and node)
        end if
    end if.
```

As another example, and without limitation, a different rule, such as the following, might be used to detect a quiet node:

```
if (IsQuietNode (nodeName, node clusters, maxCPUUsage)) then
    daysQuiet = 0
    if (quietStartDate == kNotQuietFlagDate or reportStart < quietStart)
        Database.SetQuietStartDateForNode (kNotQuietFlagDate)
    else
        daysQuiet = reportStart – quietStart
    end if
    if (daysQuiet > kMinDaysQuietToNotify)
        NotifyOfLoop (severity calculated based on daysQuiet, nodeCluster, and node)
    end if
else
```

-continued

```
Database.SetQuietStartDateForNode (kNotQuietFlagDate)
end if.
```

As shown by the examples above, the system may use dynamically chosen rules to automatically detect different types of anomalies.

In some embodiments, the exception engine 206 accesses historical data to identify an anomaly. For example, the exception engine 206 may access previously collected metric data and the workloads previously assigned such metrics and a log of any anomalies identified in the previously collected data to determine whether the data is sufficiently similar to the data currently being analyzed for the previously identified anomalies to apply.

Each rule can include user-provided exceptions, for example, to make notification triggers more or less sensitive for some grouping of computers. For example, users can access, review, modify, and otherwise interact with the rules engine via a user interface. As another example, users can interact with the user interface to modify notification rules (regarding, e.g., when, how, and who the system notifies one or more users about a rule-triggering event); the user interface may allow a user to provide details regarding what text goes into a notification, what ticket file(s) are generated (e.g., for bookkeeping), and what event triggers generation of a ticket.

Identifying an anomaly triggers a notification. A notification is data about an anomaly, containing at minimum the type of anomaly, the name of the node exhibiting it, the date range that it manifested, and a severity estimate. It often contains other information specific to a particular type of anomaly, such as a workload name if the anomaly was associated with a particular workload. Notifications may be recorded in the database. Notifications may be broadcast to users in a variety of ways, depending on the estimated severity of the notification. In one embodiment, notifications are presented to the user via a user interface.

In one embodiment, these notifications are visible in web-based user interfaces as an entry in a notification list, hyperlinked to reports displaying data demonstrating the anomaly. In other embodiments, such as more important notifications, they are also sent in email to interested users. In other embodiments, they may also be written out in files for integration with company ticketing systems. In other embodiments, they might also be presented via an application programming interface (API). Notification data, such as ticket file names, locations, and contents are all controlled via user customizable templates, easing integration issues. Note that any of these embodiments may also have a system to suppress notifications.

In some embodiments, the bases of integrating with company ticketing systems are the notifications generated by the exception engine 206. In one of these embodiments, notifications are generated on an individual node basis and can be viewed on the node's report web pages. Users may specify which node's notifications they want to receive (e.g., "subscribe"); users may also specify individual nodes, as well as groups of nodes (called "node clusters"), or choose "All Nodes" to receive all notifications. Notifications may be viewed on the user's web page. Some notifications are also sent as emails by default, but individual users can choose not to receive emails. Note that "Users" here can include multiple email addresses (in the 'cc' field), and thus may be shared by multiple people. Notifications may be logged so that they can be viewed in the node and user reports. They can be sent as emails if users have included that node in their "watched" nodes and set "Send Emails" as true. In addition, notifications can be logged to a file, using a potentially different template string. This is used to support company ticketing systems that are developed by different venders with specific APIs.

In some embodiments, notifications include a date, node, level, component, ticket file path, an email template and a ticket file template. They may have template arguments, which at least include an identification of the node. Levels of severity may include, for example, Note, Warning, Problem, and Alert. In one of these embodiments, problems and alerts are sent in emails by default, notes and warnings are not. Components include Admin, CPU, Disk, Memory, Network, and Workload. Most notifications support exceptions, but the details may vary between notifications. Exceptions may trigger by regular expression matching on one or more arguments, and can modify various notification parameters. Exceptions may analyze at the level of a Rules match, and can modify or suppress a notification. If the exception triggers, and the node no longer matches the rule for the level, it drops to the next lowest level and continues to look at exceptions. If it ever matches an exception with SUPPRESS, then it stops matching and does not trigger the rule. The above implies that exceptions are, in some embodiments, listed in LEVEL order, from most severe down, and that they can only make it harder to trigger rules, not easier. Examples of notifications include, without limitation, administrative notifications (e.g., creation of a new node and identification of a missing node), computer processing unit notifications (e.g., excess usage including an identification of how much usage a workload is consuming), disk notifications (e.g., excess usage), performance degradation notifications (e.g., identification of an amount of time until a disk is full), memory notifications (e.g., excess usage), and workload notifications (e.g., excess usage).

In one embodiment, identifying the anomaly triggers a notification to a user. In another embodiment, the notification is provided via a user interface. In some embodiments, when the exception engine 206 identifies an operational or performance anomaly, the exception engine 206 triggers a notification. Several techniques may be used to make rules notification scale gracefully to thousands of machines/servers/nodes, virtual or physical. For example:

The notification system allows for multiple potential notifications, including ticketing, email notification, and web interface display, with only the most important problems triggering the more aggressive forms of notification. Users can easily add or modify the trigger points for different notification types.

Rules all support exceptions, which modify the trigger sensitivity-based, regular expression match on features such as an operating system, workload, and particular computer. This may reduce false positives while letting users maximize rule sensitivity for crucial cases (such as crisis management, and predictive modeling described below).

Users typically only care about a subset of computers in a large enterprise, and are not interested in all computers in the enterprise. As such, users want reports only on the computers in their sphere of influence. Users can easily tailor the notification system described herein to only report to them problems on a subset of all computers. Users may choose to subscribe only to reports on the computers they care about. Also, computers can be hierarchically organized into groups based on location, software run, or resource consumption behaviors, and users can request reports from any set of groups and/or individual computers.

A web notification interface (e.g., user interface 218) may automatically suppress redundant notifications, showing only the most recent notifications when germane. For example, if a computer has not reported results for several days, users will see a single notification saying "Computer X has not reported for N days" rather than seeing N reports, one for each day it has not reported. Note that status updates continue and adjust dynamically for the length of the anomaly. Users can also decide how many notifications or reports to generate after N days without receiving reports from Computer X.

The web notification interface (e.g., user interface 218) allows powerful and rapid sorting and searching, including by date, computer, notification type, notification severity, other computers running the same applications, the host computer in the case of a virtual server, and arbitrary text search of the notification. Software debugging is often driven by process name information. Typically patches and fixes to specific versions of software become available from the software vendor. Being able to accurately describe the malfunctioning software speeds the identification of problem software and its eventual fix. Providing detailed instructions regarding how to mitigate an operational or performance anomaly based on automated workload characterization and association of one or more workloads with processes, which in turn is based on analyses of gathered, preprocessed metrics data, may provide enhanced functionality for users.

Notifications hyperlinks may be provided to a report (computer, date, and resource type) that shows the underlying problem in detail. Web delivered notifications may enable rapid review of issues with historical context, e.g., when the issues started, their duration, and sometimes their effect, such as resource exhaustion or response-time problems, speedily done with corporate instant messaging hyperlinks.

As it is often the case that a node or set of nodes comprises a category of processing, in one embodiment the system can exploit this feature to automatically categorize nodes or clusters of nodes. Similar to the workload categorization, node characterization can be used to determine what other agents (for example e-mail lists, or GUI) are appropriate for notification. This may simplify the mapping of nodes to responsible agents. One embodiment would keep this information in a Configuration Management Database (CMDB). Note that in some embodiments, the ability of a process to move in time is recorded in a CMDB. In another embodiment, the system 200 can maintain the node configuration and maintain change lists as the node undergoes hardware changes. This may be valuable in analyzing performance issues and metrics, especially when the processing is in a cloud environment. One embodiment would provide the user with a simple user interface for classifying and reclassifying nodes, as they need to be reassigned. For example, a multiple-bubble word cloud could show what category each group of nodes belongs to, with the most recent classification in larger text.

The method 300 includes providing a recommendation for mitigating the operational anomaly (312). The method 300 may also include providing a recommendation for mitigating a performance bottleneck. In one embodiment, providing a recommendation includes identifying a modification to a computing resource to mitigate the identified operational or performance anomaly. For example, the recommendation may include identifying a modification to software executed by the computing resource. As another example, the recommendation may include identifying a modification to a hardware component of the computing resource. In one embodiment, the exception engine 206 generates the recommendation. In another embodiment, the exception engine 206 provides the recommendation to a user. In still another embodiment, the exception engine 206 provides the recommendation to the data sequencing engine 208 for population of a user interface. In some embodiments, these recommendations are important because users are dissatisfied with their application's performance Using embodiments such as the ones described above to evaluate disparate resource consumption patterns and compute likely queuing for resources and reasons for bottlenecks, this system can largely automate analysis and diagnosis delays. This enables IT personnel to quickly decide on a prudent course of action given their organization's technical and political constraints In some embodiments, the exception engine 206 determines that a rule identifies the recommendation. In one of these embodiments, in analyzing a metric and a related process, the exception engine 206 applies a rule and determines that the metric triggers an exception to the rule, as described above. By way of example, and without limitation, if the exception engine 206 determines that a certain process is looping (e.g., 97%<CPU<100% for >8 hours in a multiprocessor environment), the exception engine 206 triggers a notification to a user regarding the loop; the exception engine 206 may then further analyze a command stream associated with the looping code, identify an application type and version level, and perform a query to determine whether the application version level needs updating, potentially triggering another notification to the user to update the application.

In other embodiments, the exception engine 206 accesses information from metadata stored with a notification to make the recommendation for mitigating the anomaly. This metadata includes, but is not limited to, process name, notification type, and path to executable. The exception engine 206 may select a recommendation based on a series of if-then tests on the metadata. Note that its possible for more than one recommendation to be presented. By way of example, the exception engine 206 may add a recommendation to a notification and include a uniform resource identifier providing additional information regarding the recommendation. For example, and without limitation, the exception engine 206 may provide a notification that indicates that on a particular date, a particular process began using an amount of CPU and continues to do so; the exception engine 206 may provide a description of a workload or application associated with the process and an identification of a location where the reader may find additional information. Such a notification may be provided as follows: "2015\02\10 CPULoopMomperfsnapshothelper (PID 4136) used at least 0.96 CPU from 00:00:00 (CST) to 00:00:00 (CST), and is still doing so. Momperfsnapshothelper is part of Microsoft Monitoring Agent. There is a hotfix available for cases of excessive CPU usage. See: Hotfix."

In one embodiment, providing a recommendation includes identifying a failure point in a computing resource installation or integration activity, based on the identified anomaly. In another embodiment, providing a recommendation may include predicting a failure point in a computing resource installation or integration activity, based on the identified anomaly. In still another embodiment, the predictive modeling engine 210 may provide the prediction. In one embodiment, the data sequencing engine 208 populates the recommendation into the user interface 218.

In some embodiments, identifying a failure point includes identifying a performance degradation, which may mean that systems and/or applications fail to meet their service level objectives (or agreement). In other embodiments, identifying a failure point includes identifying resource exhaustion, which may cause system and/or applications to pause or stop functioning completely. Such failures can occur at any stage of system and application lifecycle, from installation, to testing, to integration, to production. For example, when a disk is going to be filled up in 90 days, users may get a "Warning" notification with an email (or any other ticketing method) stating: "Disk ABC will be full in 90 days, with moderate confidence." Continuing with this example, if users do not take action to address the issue in two months (60 days), they may get a "Problem" notification: "Disk ABC will be full in 30 days, with moderate confidence." If nothing is done in another 20 days in this example, an "Alert" may be sent: "Disk ABC will be full in 10 days, with moderate confidence." The system may apply one or more rules to generate such notifications.

As an example of a performance degradation notification, for example, if CPU utilization for a workload, W1, is more than 87% for more than 8 hours, user may get a "Warning" via an email: "Consumed 90% of available CPU from 9:00 am EST to 6:00 pm EST, W1 used 92%." Note that, in this example, at 92% of the CPU utilization, the response time of workload W1 would be more than 12 times of the workload service time, which is the workload response time without any waiting. As another example, if the CPU utilization for workload W1 is more than 95% for more than 8 hours, the user may get a "Problem" notification: "Consumed 96% of available CPU from 9:00 am EST to 6:00 pm EST, W1 used 96%." Note that at 96% of the CPU utilization, the response time of workload W1 would be more than 25 times of the workload service time, which is the workload response time without any waiting. As indicated above, the relationship between CPU utilization and response time is not necessarily linear: when CPU utilization changes from 92% to 96%, about 4% change, the response times are doubled. The system may apply a rule to determine whether and when to generate a notification.

The system 200 may be used to model the bottlenecks that will impact response time and potentially cause major or catastrophic delays when introducing new system demands or new software over a network of computers. These system-wide modifications can be preflighted via modeling on a smaller test sample of servers to identify and fix potential problems, eliminating them entirely, before system-wide rollout. This may reduce integration and installation support costs for major software project rollouts.

In one embodiment, as indicated above, the predictive modeling engine 210 generates data that, when displayed to a user via a user interface, allows users to forecast how changes in hardware, software scheduling, or user demand will impact perceived system response time, and thus resource loading, purchasing decisions, and most importantly delays in user response time and productivity loss. By way of example, and without limitation or loss of generality, in one instance, there may be n workloads, i.e., the "software," running on a server, i.e., the "hardware." Workload arrival/request rate, x, is the "user demand." Workload service time, s, is determined by the power of the hardware: as the power of the hardware increases, the service time of the workload decreases. The perceived system (i.e., server) response time, therefore, may be provided as the average of perceived workload response time: Perceived system response time=Sum of (workload(i) response time*x(i))/Sum of (workload arrival rate x(i)). In some embodiments, workload response time can be computed as a relationship between workload service time and workload arrival rate and an optional adjustment factor may be applied to account for a standard deviation of service and arrival times. Recommendations may be made based on modifications to hardware (which impact workload service time, workload response time, and system response time) or modifications to demand (impacting workload arrival rate, workload response time, and system response time). Total workload arrival rate to a server, e.g., A, can be reduced by moving some workloads to a different server, e.g., B; the servers with fewer workloads will have smaller response time; the server with more workloads will have larger response time. The methods described herein can help users determine the optimal number of workloads in each server (the arrival rate to each server) and the optimal processing power needed for the server to achieve workload as well as response time objectives. Similarly, the methods and systems described herein allow the crisis avoidance engine 216 to determine when a system will saturate and enter a crisis stage when workload arrival time and system response time become unboundedly large.

In one embodiment, providing a recommendation includes identifying a cause of a computing resource shutdown, based on the identified anomaly. In another embodiment, providing a recommendation may include predicting a cause of a computing resource shutdown, based on the identified anomaly. In still another embodiment, the predictive modeling engine 210 may generate the recommendation. In yet another embodiment, the crisis avoidance engine 216 may generate the recommendation. In one embodiment, the data sequencing engine 208 populates the recommendation into the user interface 218. In cases where a system-wide failure has occurred, the analytical facilities of the system 200 can be used to quickly focus on the underlying cause of the needs to be addressed. The workload-based analysis and focus on response time addresses not just on the impact of what has occurred, but why it occurred, where it occurred, when it occurred, and how it occurred. The methods described above permit an accurate model of server performance to be built, and most problems may be rapidly identified by a method of identifying where queues have developed as software processes are waiting for resources, which are being consumed by other misbehaving software applications or hardware failures or hardware limitations. Conventional methods do not automatically identify queues, as the computational loads of any method not using workloads may be prohibitively high. However, the workload-based models described herein use queuing theory techniques to identify and/or predict queues, or bottlenecks of resource consumption, thereby permitting crisis level events, whether they are current or may occur in the future, in an enterprise IT to be rapidly identified and fixed.

In some embodiments, the methods described herein provide functionality for identifying performance-related shutdown in which a particular device or component (e.g., CPU, disk, network cards, and memory space) are saturated or filled up. There are many reasons for a shutdown with hardware and/or software related issues. The disclosure herein focuses primarily on performance related shutdown, which usually means that a particular device or component (CPU, disk, network cards, memory space) is saturated or filled up. Sometimes, although the system does not shutdown, the response time is so long no users or application will wait for the results to come back. In those situations, users often reboot the system, remove the waiting jobs and start over. In other words, the system may experience a manual shutdown or an automatic shutdown. As one example in which CPU utilization exceeds a first threshold T1% for X1 hours, followed by exceeding a second threshold T2% by X2 hours, the system may predict that there are X1*(95−T1)/(T2−T1)−X2 hours left before the CPU utilization exceeds 95% CPU utilization. The system may also compute a level of "urgency," a value between 0 and 1, 1 being the most critical, to provide recommendations accordingly; for example: X2*(T2−T1)/[X1*(95−T1)].

The initial goal of anomaly detection is to greatly reduce the amount of chaotic and needless processing done. After establishment of a new "normal baseline usage," it often becomes clear that resources greatly exceed need. When an application that previously required many machines because of needless consumption anomalies is "cured," it often means that there is a plurality of empty or lightly used machines. "Application collapsing" refers to the process of reducing the machines devoted to an application, collapsing back down to the fewer OS images actually needed. "Application stacking" occurs when servers that previously only had single applications on them due to perceived performance concerns or corporate politics now are shown to be minor resource consumers. As such, there is now room on the machine to "stack" another application or more on the machine too. There are often great potential monetary savings due to software license reduction/sharing and even user perceived performance gains when software previously located on separate hardware separated by a network link are stacked on the same machine, eliminating the previously endured network communication lag times. After collapsing and stacking, there are often OS images miming no applications at all, just maintenance programs like backups and antivirus, security and monitoring software. At some organizations, these can be forgotten for years, using power and license costs for no benefit. Due to automated workload characterization as described herein, the system 200 will notice when only tools are miming and, after a user defined "grace period," will recommend that the node get a final backup and be shut off, or "parked" until needed. The above processing describes three fundamental operations, Collapse, which means grouping related processes onto a smaller number of machines (virtual or otherwise), Stack, a related process in which multiple machines are combined into a smaller number of machines, and Park, in which unused machines are powered off. These operations have economic advantages and, in some cases, performance advantages.

In one embodiment, providing a recommendation includes identifying a modification to at least one software application in order to reduce an overall level of software footprint or resource consumption. In another embodiment, providing a recommendation includes optimizing a number and utility of executed virtual machines, based on one or more analyses by the system 200. In another embodiment, the virtualization optimization engine 212 generates the recommendation. In one embodiment, the data sequencing engine 208 populates the recommendation into the user interface 218. After important notifications have been resolved, users can use the web elements (e.g., user interface 218) to further optimize usage of virtual machine guests and hosts. Accurate modeling of virtual machine usage, both average and peak, and elimination of operational anomaly capacity usage and randomness may allow for more virtual machines to be added to a single physical host server, without negative impact on response time. Multiple software applications, each of which was on its own server due to administrative fears of application misbehavior affecting other applications, may be stacked onto a single O/S image, thereby reducing dramatically the number of O/S images (each of which equals an entire server) and all the associated costs and resource consumptions of multiple, redundant tools, antivirus, backup, and security applications. These many former servers may be reduced to a single server. Often many inactive virtual machines can be moved off the physical host altogether and into semi-permanent storage further eliminating O/S images and servers and all their associated costs. Different servers running related applications, e.g., application, database, and web server, can be automatically identified and be reduced to a single physical server.

In one embodiment, providing a recommendation includes providing a model of future capacity needs of computing resources to predict failure and allow for optimized addition of resources. In another embodiment, the virtualization optimization engine 212 generates the recommendation. In still another embodiment, the predictive modeling engine 210 may generate the recommendation. In one embodiment, the data sequencing engine 208 populates the recommendation into the user interface 218. Capacity may be computed for a variety of computing resources. As one example, and without limitation, a user may specify a system response time objective, R. Exceeding the response time objective for an extended period may be considered a performance failure, which may have a significant business impact; at a current or baseline system state, the service time (an indication of computing or processing power) is s0 and the response time is r0. To achieve the response time objective, R, in some embodiments, the service time can be adjusted to: S=R/[1+R*(r0−s0)/r0/s0], which is a function of response time objective R, the response time measurement at baseline, r0 and processing power indicator s0 at the baseline. As another example, when one wants to reduce the response time by 50%, i.e., reducing r0 to r0/2, the service time S would be S=[1/(1+s0/r0)]*s0, which is a value greater than s0/2. As another example, when baseline service time s0 is 1 second and response time is 4 seconds, to achieve 2 seconds response time objective, the desired service time S may be calculated as follows: S=R/[1+R*(r0−s0)/r0/s0]=2/[1+2*(4−1)/4/1]=0.8. Response time objective and service time objective may have a non-linear relationship.

The data sequencing engine 208 may populate the user interface 218 with data generated by one or more of the client agent 202, the workload engine 204, and the exception engine 206. The data sequencing engine 208 may populate the user interface 218 with one or more identifications of operational and performance anomalies. The data sequencing engine 208 may populate the user interface 218 with one or more recommendations to a user for addressing operational and performance anomalies. The data sequencing engine 208 may populate the user interface 218 with identifications of workflows associated with data gathered by the client agent 202.

In one embodiment, the user interface 218 allows rapid review and decision making regarding the operational and performance status and utility of all elements of any server-based network of n=1 to thousands of servers. In another embodiment, the user interface 218 allows instant access to operating information (capacity, utility, location, dependencies) for computing resources (e.g., servers, memory devices, etc.) categorized by, for example, time and performance variables; such information is able to be grouped for meta-analysis of errors, able to be located and characterized instantly, and available for workload coloration. The user interface 218 can take advantage of data that has already been processed during collection and notification generation. Data compression and caching allows rapid display of large datasets, and the workload orientation lets the user interface 218 advise the user using expert advice built into the notification system. In one embodiment, the system 200 pre-generates large amounts of small daily summary graphs so the user interface 218 can show historical data without excessive delays. In another embodiment, the data sequence is optimized for rapid organization around a workload set, letting users seamlessly display different workload classification schemes (by Class or by User, for example). Key data points may be pulled out for use in the advice system, letting the user receive accurate analysis of the data she is viewing. In one embodiment, the advice system provides access to recommendations for mitigating or avoiding operational and/or performance anomalies. For example, and without limitation, advice may include recommendations that a user install a patch for a software program, that a user work with a database administrator to re-index a database, or redistribute an I/O load to a computing resource with additional capacity.

In one embodiment the system 200 is optimized for scalability. This scalability allows the system to operate on hundreds of thousands of nodes or servers. Several design considerations are used, including, by way of example:

The underlying database can be easily spread out across an appropriate number of nodes. Preliminary analysis is that a single system (node) may support up to 100,000 nodes/servers.

Components 202a and 202b may be designed to require less than one percent of the CPU on a node. In some embodiments, their combined worst-case database access time may be about five seconds per 10,000 nodes.

The machine 106a has been designed with the ability to be replicated on as many nodes as needed. Preliminary analysis shows that a single instance may handle 100,000 nodes and hundreds of users.

In another embodiment, the system 200 is optimized to focus personnel on fixing key problems interrupting production functionality first and also describing other issues that might also be present but not as important to the users. For example, a software loop may be identified, which a user may consider "bad," at the same time a backup is going on, which a user may consider "okay," and possibly a large virus scan, which may or may not be a problem depending on the situation. The system 200 may provide functionality to focus scarce human resources on actionable activities that improve and enable performance at optimum levels, in terms of application performance, user perceived response time, and ultimately costs and avoidance of crises. In one embodiment, the user interface 218 optimizes the minimalist reporting to quickly focus average users on actionable activities. The system 200 may also provide more in-depth reporting for the more expert user class to take even more advantage of the same data sources. One embodiment purposely reduces the complexity of the user interface to a few simple questions that will solve most issues. Other embodiments will provide more advanced interfaces for more sophisticated users. For example, showing correlations across the different metrics (e.g., time or percentage load based) provides an advanced user with more insights into system performance. Further analysis, for example, could show surface or time graphs on various metrics or workloads. In another embodiment, data can be grouped into a volume, and volume-rendering techniques can be used to show highlighted weighted projections of these correlations.

In some embodiments, iteratively gathering and preprocessing data and concatenating the newly preprocessed metrics to previously processed metrics provide additional benefits. In one of these embodiments, by concatenating data, users can more easily visualize a pattern, especially if this pattern has a period that exceeds the usual look-back period. Note that by repeating this sequence of steps, the overall system can be maintained at a high level of efficiency. Additionally, deviations from past performance can be quickly detected and corrected. Also, the rules will change as the target system evolves and becomes more effective. In short, in some embodiments, this is an iterative process. In some embodiments, this is a linear process.

In some embodiments, the system 200 includes functionality (e.g., a user interface) providing a user with a recommended sequence of events for implementing the methods described herein. By way of example, and without limitation, the system 200 may recommend that a user first install client agents 202. Then three main sets of tasks will be recommended. Note that these tasks are iterative, meaning that they are all continuously performed.

Fix anomalies and bad behaviors identified by the system 200. Some specific examples include:

Remove CPU Loops, which are single threaded processes that monopolize a CPU.

Remove Memory ramps, which are processes that continue to request more memory the longer they are run.

Remove bottlenecks and become aware of upcoming capacity limitations.

Remove I/O bottlenecks, which are delays caused by excessive requests for IO, and are generally caused by a poorly written application(s) or a poorly chosen configuration of application(s).

Remove Network bottlenecks, which are excessive delays caused by either failing equipment and/or poor choice of locations of network resources.

Alleviate Full Disk Drives or drives at risk to fill soon, which can be caused by configurations with excessive logging, or undersized disks. For example, add disk space to any disk drive that looks like it will run out of space in the next 60 days and work with the applications to improve their data retention designs.

Move non-time critical processes, such as backup loads or virus scans to times of least impact.

Evaluate whether overhead (antivirus, security, etc.) are valid loads. Turn off invalid loads. Adjust antivirus settings to be efficient (which can cut antivirus loads by two orders of magnitude in some systems).

Optimize applications and virtual machines. For example:

Collapse related applications, e.g., application, database and web server, onto a single server with sufficient capacity.

Stack multiple applications onto a single O/S image.

Park stagnant applications and shut down the server or VM.

In some embodiments, these steps may eliminate 80-90% of O/S images and useless overhead, resulting in huge cost savings.

Identify and publish fix for any group or application bottlenecks. The software may identify related servers and find the servers likely to fail first if compute loads go up. The user may choose to add capacity to those servers until desired service level objective (SLO) and performance headroom are achieved.

Find anomalies causing a current crisis.

All of the above actions will provide information to track down the cause of a crisis.

Additional displays will probably need to be examined, such as users and processes workloads.

In some cases, specific workload characterization rules will need to be created.

History of how workloads behave is often a good clue as to where the current crises anomaly exists.

In some embodiments, the methods and systems described herein provide functionality for anomaly identification and information technology infrastructure resource optimization. In one of these embodiments, implementation of the methods and systems described herein provides increased resource utilization and enterprise productivity, reducing or eliminating the need for new computing resources, facilities, and support.

It should be understood that the systems described above may provide multiple ones of any or each of those components and these components may be provided on either a standalone machine or, in some embodiments, on multiple machines in a distributed system. The phrases 'in one embodiment,' 'in another embodiment,' and the like, generally mean that the particular feature, structure, step, or characteristic following the phrase is included in at least one embodiment of the present disclosure and may be included in more than one embodiment of the present disclosure. Such phrases may, but do not necessarily, refer to the same embodiment.

The systems and methods described above may be implemented as a method, apparatus, or article of manufacture using programming and/or engineering techniques to produce software, firmware, hardware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be LISP, PROLOG, PERL, C, C++, C#, JAVA, or any compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of computer-readable devices, firmware, programmable logic, hardware (e.g., integrated circuit chip; electronic devices; a computer-readable non-volatile storage unit; non-volatile memory, such as semiconductor memory devices, including EPROM, EEPROM, and flash memory devices; magnetic disks such as internal hard disks and removable disks; magneto-optical disks; and CD-ROMs). Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium. A computer may also receive programs and data from a second computer providing access to the programs via a network transmission line, wireless transmission media, signals propagating through space, radio waves, infrared signals, etc.

Having described certain embodiments of methods and systems for anomaly identification and information technology resource optimization, it will now become apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A method for anomaly identification and IT resource optimization, the method comprising:

retrieving, by a workload engine executing on a first computing resource, from a database populated by a client agent executing on a second computing resource in communication with the database over at least one computer network, a metric associated with a process;

analyzing, by the workload engine, the retrieved metric and the process, enabling association of at least one workload to the process, wherein the at least one workload provides a semantic category for the process;

associating, by the workload engine, the at least one workload with the process, responsive to the analysis;

analyzing, by an exception engine executing on the first computing resource, the retrieved metric, the process, and the at least one workload, enabling identification of an operational anomaly within the process, wherein analyzing of the retrieved metric, the process, and the at least one workload, by the exception engine, further comprises:

applying at least one workload rule to the at least one workload; and identifying, by the exception engine, an operational anomaly within the process, responsive to the analysis by the exception engine; and providing a recommendation generated by the first computing resource for mitigating the operational anomaly, wherein retrieving, by the workload engine, the metric associated with the process further comprises retrieving the metric associated with the process from the database populated by the client agent with metric data collected from the second computing resource at a sampling interval, the sampling interval automatically adjusted by the client agent.

2. The method of claim 1 further comprising collecting, by the client agent, the metric data at randomized sampling intervals.

3. The method of claim 1 further comprising preprocessing, by the client agent, metric data before populating the database.

4. The method of claim 1 further comprising mathematically condensing a plurality of metrics into the metric populated into the database.

5. The method of claim 1 further comprising populating, by the client agent, the database with a subset of available sampling metrics.

6. The method of claim 1 further comprising populating, by the client agent, the database with metric data known to impact perceived user response time.

7. The method of claim 1 further comprising applying, by the workload engine, a rule to an attribute of a process to determine to associate the at least one workload with the process.

8. The method of claim 1 further comprising identifying, by the workload engine, at least one workload to associate with the process, the identified at least one workload identifying a type of the process.

9. The method of claim 1 further comprising associating, by the workload engine, the at least one workload with a process name identifying an application that initiated execution of the process.

10. A non-transitory computer-readable medium tangibly storing instructions executable by at least one computer processor to perform a method for anomaly identification and FT resource optimization, the instructions comprising:
   instructions to retrieve, by a workload engine executing on a first computing resource, from a database populated by a client agent executing on a second computing resource in communication with the database over at least one computer network, a metric associated with a process;
   instructions to analyze, by the workload engine, the retrieved metric and the process to enable association of at least one workload to the process, wherein the at least one workload provides a semantic category for the process; instructions to associate, by the workload engine, the at least one workload with the process, responsive to the analysis;
   instructions to analyze, by an exception engine executing on the first computing resource, the retrieved metric, the process, and the at least one workload, enabling identification of an operational anomaly within the process, wherein instructions to analyze the retrieved metric, the process, and the at least one workload, by the exception engine, further comprise:
      instructions to apply at least one workload rule to the at least one workload; and
      instructions to identify, by the exception engine, an operational anomaly within the process, responsive to the analysis by the exception engine; and
   instructions to provide a recommendation generated by the first computing resource for mitigating the operational anomaly;
   wherein retrieving, by the workload engine, the metric associated with the process further comprises retrieving the metric associated with the process from the database populated by the client agent with metric data collected from the second computing resource at a sampling interval, the sampling interval automatically adjusted by the client agent.

11. The non-transitory computer-readable medium of claim 10 further comprising instructions to collect, by the client agent, the metric data at randomized sampling intervals.

12. The non-transitory computer-readable medium of claim 10 further comprising instructions to preprocess, by the client agent, metric data before populating the database.

13. The non-transitory computer-readable medium of claim 10 further comprising instructions to mathematically condense a plurality of metrics into the metric populated into the database.

* * * * *

UNITED STATES PATENT AND TRADEMARK OFFICE
CERTIFICATE OF CORRECTION

PATENT NO. : 10,129,168 B2
APPLICATION NO. : 14/730377
DATED : November 13, 2018
INVENTOR(S) : Kaminski et al.

Page 1 of 1

It is certified that error appears in the above-identified patent and that said Letters Patent is hereby corrected as shown below:

In the Specification

In Column 1, Line 29, delete "demand" and insert -- demand. --, therefor.

In Column 5, Line 50, delete "SCl/LAMP" and insert -- SCI/LAMP --, therefor.

In Column 5, Line 63, delete "miming" and insert -- running --, therefor.

In Column 8, Line 4, delete "sever" and insert -- server --, therefor.

In Column 12, Lines 33-34, delete "workflow engine 204" and insert -- workload engine 204 --, therefor.

In Column 26, Line 14, delete "performance" and insert -- performance. --, therefor.

In Column 26, Line 20, delete "constraints" and insert -- constraints. --, therefor.

In Column 29, Line 36, delete "miming" and insert -- running --, therefor.

In Column 29, Line 42, delete "miming" and insert -- running --, therefor.

In the Claims

In Column 35, Line 31, in Claim 10, delete "FT" and insert -- IT --, therefor.

Signed and Sealed this
Fifth Day of March, 2019

Andrei Iancu
*Director of the United States Patent and Trademark Office*